US010725885B1

(12) United States Patent
Paraschiv et al.

(10) Patent No.: US 10,725,885 B1
(45) Date of Patent: Jul. 28, 2020

(54) METHODS AND APPARATUS FOR VIRTUAL MACHINE LOAD MONITORING

(71) Applicant: Amazon Technologies, Inc., Seattle, WA (US)

(72) Inventors: Andra-Irina Paraschiv, Brăila (RO); Bogdan Constantin Vasile, Bucharest (RO); George Dumitru Cristian Milescu, Bucharest (RO)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/817,071

(22) Filed: Nov. 17, 2017

(51) Int. Cl.
*G06F 9/455* (2018.01)
*G06F 11/34* (2006.01)
*G06F 9/50* (2006.01)

(52) U.S. Cl.
CPC ...... *G06F 11/3433* (2013.01); *G06F 9/45558* (2013.01); *G06F 9/5083* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,099,487 B1 * | 1/2012 | Smirnov | G06F 11/3495 709/223 |
| 9,135,048 B2 * | 9/2015 | Klein | G06F 9/45558 |
| 9,251,115 B2 | 2/2016 | Bursell | |
| 9,292,332 B1 * | 3/2016 | Liguori | G06F 8/65 |
| 9,363,190 B2 | 6/2016 | Beloglazov et al. | |
| 9,769,085 B2 | 9/2017 | Laribi et al. | |
| 9,904,568 B2 | 2/2018 | Vincent et al. | |
| 10,171,371 B2 | 1/2019 | Anwar et al. | |
| 10,277,477 B2 | 4/2019 | Nortman | |
| 10,303,520 B2 | 5/2019 | Shim et al. | |
| 10,320,891 B2 | 6/2019 | Agarwal et al. | |
| 10,341,458 B2 | 7/2019 | Roese et al. | |

(Continued)

OTHER PUBLICATIONS

Mosa et al, Optimizing virtual machine placement for energy and SLA in clouds using utility functions, Journal of Cloud Computing: Advances, Systems and Applications, 2016, 17 pages.*

(Continued)

*Primary Examiner* — Diem K Cao
(74) *Attorney, Agent, or Firm* — Robert C. Kowert; Kowert, Hood, Munyon, Rankin & Goetzel, P.C.

(57) ABSTRACT

Methods and apparatus for virtual machine (VM) load monitoring in provider network environments. A VM load monitor system may be used to offload the processing of VM load data from the execution environment of a VM host device. A VM load monitor may be implemented as a dedicated programmable hardware device on or attached to a host device that is external to the execution environment of the host device, thus freeing host device resources (e.g., processors, memory, etc.) for use by the VMs executing on the host device. The VM load monitor may make VM management decisions for the host device (e.g. launch VM decisions, migrate VM decisions, etc.) based on analysis of resource load data (e.g. network, memory, and/or processor load data) collected from the VMs (or groups of VMs) executing on the host device.

22 Claims, 16 Drawing Sheets

(56) References Cited

U.S. PATENT DOCUMENTS

| | | |
|---|---|---|
| 10,346,190 B1 | 7/2019 | Sharifi Mehr |
| 2012/0110055 A1* | 5/2012 | Van Biljon ............ G06Q 30/04 |
| | | 709/201 |
| 2014/0082202 A1 | 3/2014 | Zhao |
| 2014/0258446 A1* | 9/2014 | Bursell ................ G06F 15/177 |
| | | 709/217 |
| 2015/0358312 A1 | 12/2015 | Kancharla et al. |
| 2016/0094401 A1 | 3/2016 | Anwar et al. |
| 2017/0214737 A1 | 7/2017 | Agarwal et al. |
| 2018/0139100 A1* | 5/2018 | Nagpal ................... H04L 41/12 |
| 2018/0287902 A1* | 10/2018 | Chitalia ................ H04L 43/045 |
| 2019/0034464 A1 | 1/2019 | Nozhchev et al. |

OTHER PUBLICATIONS

Thiruvenkadam et al, Optimized Algorithms for Virtual Machine Placment based on Multi-Diemensional Resource Characteristics in Cloud Computing Systems, Internaltional Journal of Computational Intelligence and Informatics, vol. 6, No. 1, Jun. 2016, 13 pages.*

* cited by examiner

METHODS AND APPARATUS FOR VIRTUAL MACHINE LOAD MONITORING

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1:
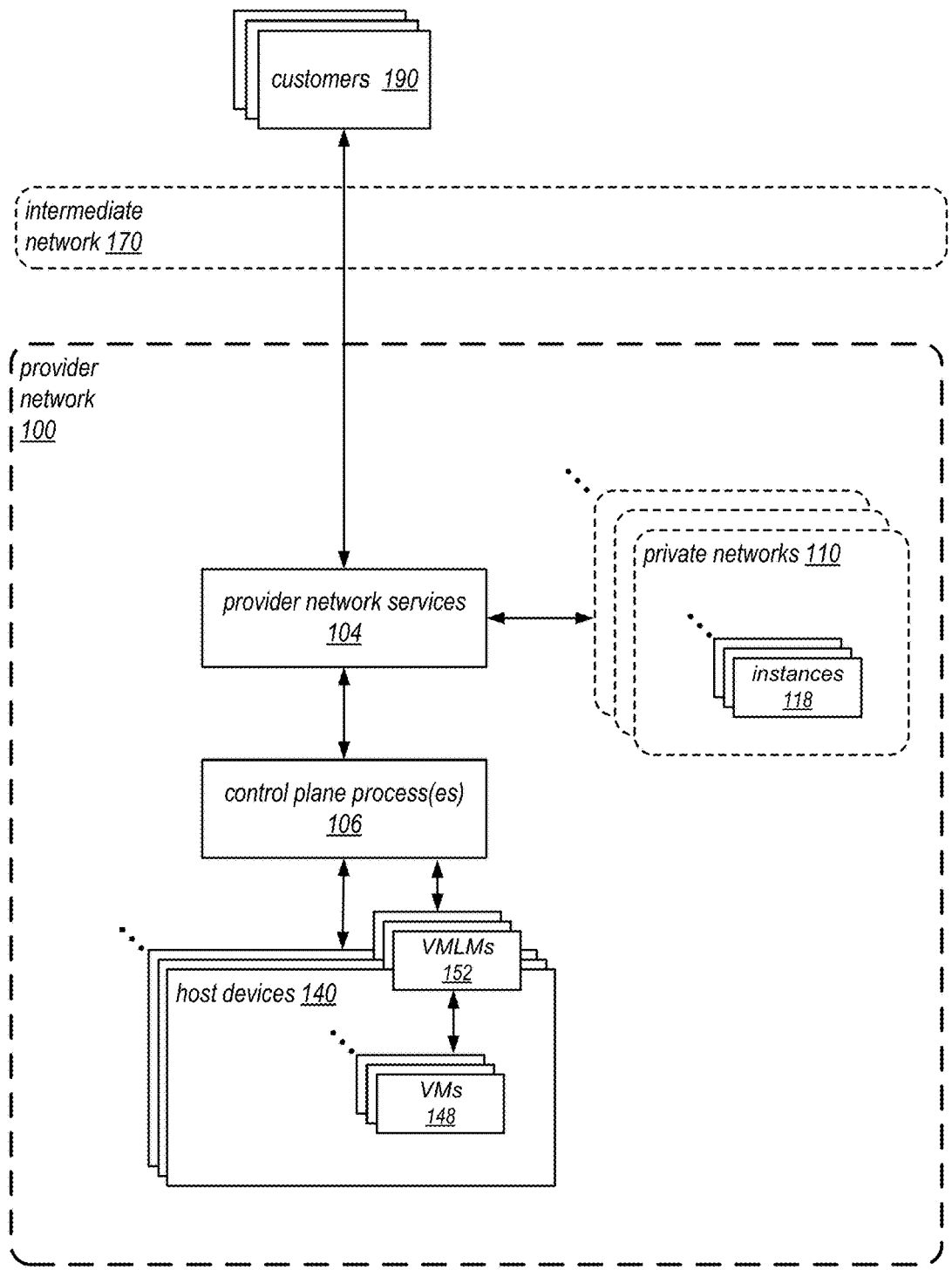
FIG. 1 illustrates host devices with VM load monitor devices in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for virtual machine (VM) load monitoring in provider network environments are described. Embodiments of a VM load monitor system that are described herein may be used to offload the processing of VM load data from the execution environment of a VM host device. A VM load monitor may be implemented as a dedicated programmable hardware device on or attached to a host device that is external to the execution environment of the host device, thus freeing host device resources (e.g., processors, memory, etc.) for use by the VMs executing on the host device.

Conventionally, in provider network environments that include host devices that execute VMs, VM load data is primarily collected, analyzed, and stored by host services executing in the execution environment of the host device in which the VMs execute. Thus, conventionally, the host resources (e.g. CPU cycles) are shared between the host services and the actual VM workload. Embodiments of the VM load monitor system offload VM load data, load analysis, and decision making from the host device's standard processors to a dedicated programmable hardware device referred to as a load monitor device or VM load monitor (VMLM). The host device's standard processors are the processors used to execute the VM workload. The VM load monitor may make VM management decisions for the host device (e.g. launch VM decisions, migrate VM decisions, etc.) based on analysis of resource load data (e.g. network, memory, and/or processor load data) collected from the VMs (or groups of VMs) executing on the host device.

The VM load monitor system may include a VM load data module that collects load data for VMs or groups of VMs executing on the host device and communicates the collected VM load data to the VM load monitor. The VM load data module may, for example, be implemented as a software module that executes in the execution environment of the respective host device. In some embodiments, the VM load data collected by the VM load data module may be sent to the VM load monitor via a dedicated communications channel that supports the throughput required for the data transfer. By using a dedicated communications channel for the VM load data, the VM load data is not sent over the same communications channels on the host device (e.g., the host device's network interface) as data input/output of the VMs.

The VM load monitor obtains the VM load data via the dedicated communications channel, analyzes the VM load data, and makes VM management decisions (e.g., launch VM and/or migrate VM decisions) based on the analysis. The VM load data obtained by the VM load monitor is input to one or more analysis engines that execute on the VM load monitor. In some embodiments, different ones of the analysis engines may implement different load analysis algorithms that perform load analysis for particular types of VMs (e.g. compute-intensive, GPU-intensive, network bandwidth-intensive, etc.). Using different load analysis algorithms for different VM types allows the load analysis and decision making to be more accurate for the different VM types when compared to using a generic load analysis algorithm. In some embodiments, the load data for each VM or group of VMs may be processed in parallel by the analysis engines so that the output of the analysis engines provides a point-in-time snapshot of the current load behavior across all VMs and groups of VMs on the host device. The output of the analysis engines includes information indicating the current load behavior of each VM or group of VMs on the host device. In some embodiments, the analysis engines may analyze the current load behavior of a VM or group of VMs in view of previous load behavior information for the VM or group of VMs to estimate and output trends in load behavior for the VM or group of VMs over time.

The VM load monitor may use the load analysis information to make VM management decisions for the host device. Examples of VM management decisions include, but are not limited to, whether current load is low enough (or whether predicted load should remain low enough) to accept a request to launch a VM or group of VMs on the host device, or whether a VM or group of VMs needs to be migrated from the host device due to current (or predicted) load. The VM load monitor sends the VM management decisions (e.g., accept/reject launch responses, requests to migrate one or more VMs, etc.) to one or more control plane processes. The VM load monitor may then perform one or more actions related to a particular VM management decision (launch VM, migrate VM, etc.).

Offloading load data analysis and decision making from the execution environment of the host device to the VM load monitor separates the resources allocated to the VMs from the resources used for VM load monitoring and management. This frees the physical machine resources of the host device for use by the VMs. In addition, separating the resources allocated to the VMs from the resources used for VM load monitoring and management may allow the VM load data to be processed more thoroughly by processes executing in the dedicated VM load monitor resources than can typically be done by host services executing in the execution environment of the host device in which the VMs also execute. Further, the dedicated VM load monitor resources may allow the analysis and decision making to be adapted for a wider number of use cases than can typically be provided by host services executing in the execution environment of the host device in which the VMs also execute.

Advantages of the VM load monitor system include, but are not limited to, the flexibility, scalability and the external hardware resources provided by the VM load monitor. The VM load monitor may be a programmable device that is external to the host device execution environment resources. As non-limiting examples, the VM load monitor may be a field-programmable gate array (FPGA) integrated circuit (IC) external to the host device execution environment resources, a peripheral card with a general purpose CPU or GPU executing VM load monitor software external to the host device execution environment resources, or an application-specific integrated circuit (ASIC) external to the host device execution environment resources. Different algorithms (referred to as analysis engines) can be used for load data analysis based on different VM configurations; thus, VM load analysis and decision making performed by the VM load monitor can be adapted to the compute, network, memory, disk, and/or GPU intensive workloads of different VM configurations. The VM load monitor can scale to the number of VMs executing on the host device; the load data analysis may be performed in parallel by the analysis engines for the VMs or group of VMs currently executing on the host device. Further, since the VM load monitor is a programmable device external to the host device execution environment, the analysis engines can be updated, replaced, removed, or added without affecting operations of the VMs executing on the host device.

VM load analysis and decision making may be performed by the VM load monitors on the provider network using a distributed model and/or using a centralized model. In the distributed model, VM management decisions are made by the local VM load monitors considering only the load behavior on the respective host devices; the decisions are sent to the control plane of the provider network. In the centralized model, VM management decisions are made by a centralized entity based on feedback from multiple VM load monitors.

In the distributed model, VM load analysis and decision making may be performed independently by the VM load monitors associated with the host devices in the provider network to initiate VM management actions. A decision regarding a VM management action for a VM can be made by the local VM load monitor, considering only the load behavior on the host device that the VM runs on. A request to perform the action may then be sent to a control plane process of the provider network. As an example, a VM load monitor may decide that one or more VMs on the respective host device need to be migrated from the respective host device due to current or predicted load exceeding a threshold for the respective host device.

VM load analysis and decision making may also be performed independently by the VM load monitors associated with the host devices in the provider network in response to requests from a centralized entity such as a control plane process. For example, a control plane process may send a request to launch one or more VMs to the VM load monitors of one or more host devices. Each VM load monitor may then independently respond to the control plane process indicating whether the host device can or cannot host the VM(s) based on analysis of the current or predicted load of the respective host devices.

In the centralized model, VM management decisions can be made based on feedback from multiple VM load monitors in response to a request from a centralized entity such as a control plane process or the VM load monitor of a host device. For example, the centralized entity can communicate with multiple VM load monitors, requesting feedback regarding a particular VM management action (e.g., a launch request received from a customer, a migration request initiated by a VM load monitor, etc.). The feedback from the multiple VM load monitors provides the centralized entity with an overview of the VM load for the multiple host devices associated with the multiple VM load monitors. The centralized entity may then make a VM management decision and perform or initiate a VM management action based on the overview of the VM load for the multiple host devices associated with the multiple VM load monitors. Thus, each of the multiple VM load monitors contributes to the final decision regarding the VM management decision made by the centralized entity. As an example, if there is scheduled maintenance for a group of host devices, destination host devices can be located by the centralized entity based on feedback from the VM load monitors on the host devices, and the VMs on the host devices that are scheduled for maintenance can be proactively migrated to the destination hosts prior to the maintenance. As another example, a control plane process may query multiple VM load monitors to obtain VM load information for their respective host devices. The control plane process may then analyze the VM load information to select a host device to host one or more VMs that are to be launched or migrated from another host device.

In some embodiments, the VM load monitors on the provider network may use a dedicated communications channel (e.g. a dedicated network substrate) to communicate to the provider network control plane processes and/or to other VM load monitors on the provider network.

In some embodiments, the VM load monitor system may employ machine learning algorithms to detect patterns of load behavior for VMs or groups of VMs on the host devices over time. These patterns may be used to more accurately predict future VM load behaviors based on past VM load behaviors.

Use cases of the VM load monitor systems include making VM management decisions for host devices regarding VM launches and VM migrations. A VM load monitor may respond to a VM launch request received from a control plane process indicating whether or not the respective host device can launch one or more VMs indicated by the request. A VM load monitor may also proactively initiate VM migrations from the respective host device based on load analysis for the respective host device, maintenance schedules for the respective host device, security requirements of VMs on the respective host device, or for other reasons.

In addition, in some embodiments, a VM load monitor may detect suspicious or malicious behavior (e.g., a security attack on one or more VMs) based on the VM load analysis, and can responsively isolate or evict a VM or VMs to limit the blast radius of the event.

In addition, since the VM load monitor is external to the execution environment of the host device and receives VM load data from the host device, the VM load monitor may detect critical load behavior or unresponsiveness of the host device, and trigger an alarm to a control plane process to indicate that the host device is in a critical state or down.

In addition, in some embodiments, a VM load monitor may monitor and throttle host device resources used by VMs on the host device, for example based on a service level agreement (SLA) between a customer and the service provider that provides the provider network. If the VM load monitor detects that a VM may need additional resources to satisfy the SLA, the VM load monitor may proactively take action to provide the resources. For example, the VM load monitor may monitor and throttle a VM's use of Peripheral Component Interconnect (PCI) pass-through devices on the host device. If analysis of the load data by the VM load monitor detects or predicts that the VM's use of the PCI device is or will be at a high level, multiple PCI devices may be used with a multipath networking protocol or interface bonding protocol to meet the VM's current or predicted high level of resource use. If the resources needed cannot be provided by the host device, a migration of one or more VMs from the host device may be initiated.

Figure 2A:
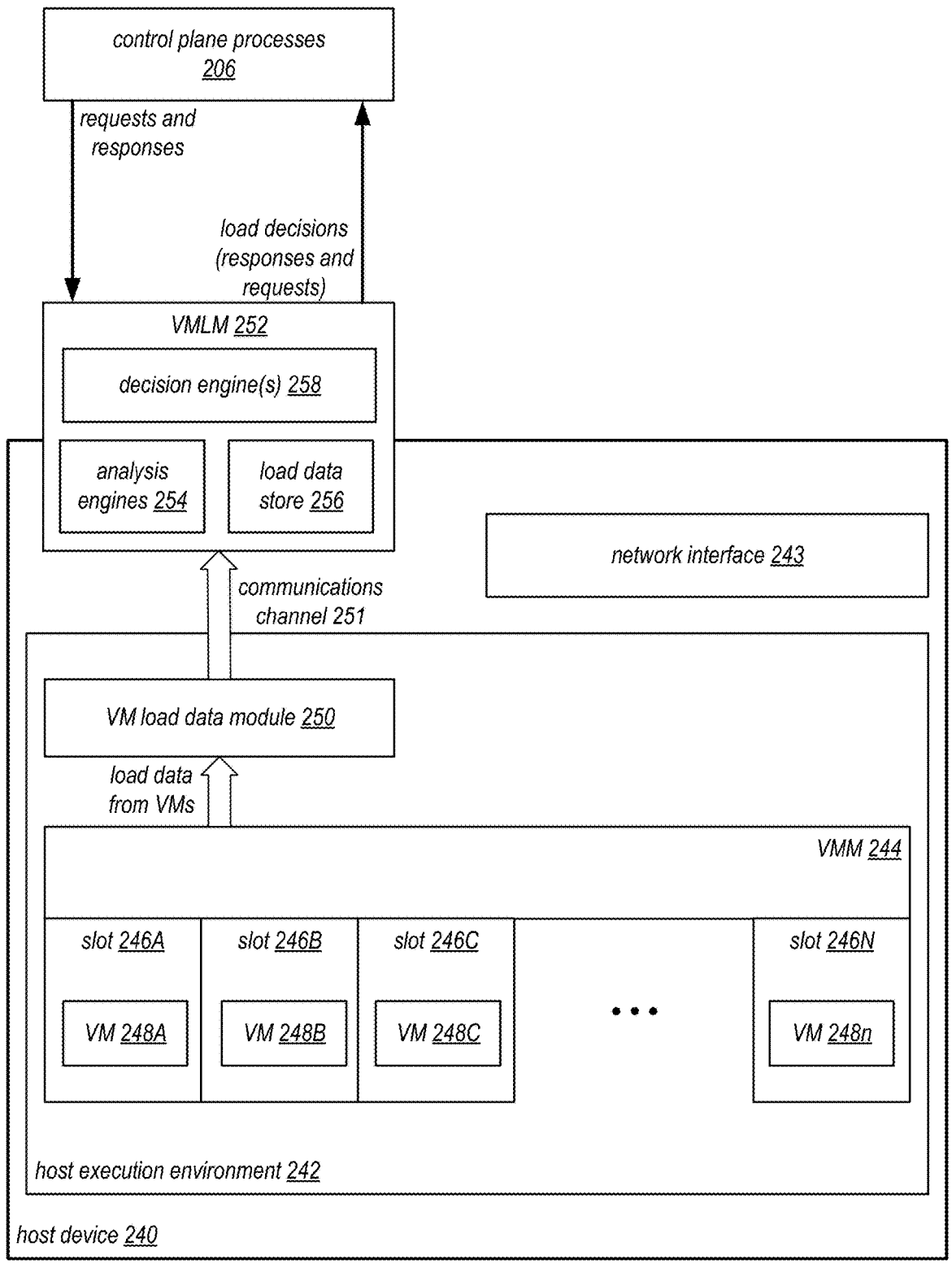
FIGS. 2A and 2B illustrate a host device with a VM load monitor system, according to some embodiments.

FIG. 1 illustrates an example provider network environment in which the VM load monitor system may be implemented, according to some embodiments. In at least some embodiments of a provider network 100, at least some of the resources provided to customers 190 via the provider network 100 may be virtualized computing resources (also referred to as virtual machines (VMs)) executed on multi-tenant hardware that is shared with other customer(s) 190 and/or on hardware dedicated to a particular customer 190. A host device 140 may be a computing device on the provider network 100 that includes hardware virtualization technology (hardware and software) that provides multiple slots in which VMs 148 may be installed. The VMs 148 on a host device 140 may be provisioned with a given amount of resources (memory space, storage (e.g., disk) space, computation (e.g., CPU) resources etc.) on the respective host device 140. FIG. 2A illustrates an example host device 140 in more detail.

The host devices 140 on the provider network 100 may implement VM load monitor systems as described herein. A VM load monitor system for a host device 140 may include a VM load monitor (VMLM) 152 that monitors VM load on the host device 140. A VMLM 152 may be a programmable device that is external to the respective host device 140's execution environment resources. As non-limiting examples, a VMLM 152 may be a field-programmable gate array (FPGA) integrated circuit (IC) external to the host device 140's execution environment resources, a peripheral card with a general purpose CPU or GPU executing VM load monitor software external to the host device execution environment resources, or an application-specific integrated circuit (ASIC) external to the host device execution environment resources. FIGS. 2 and 3 illustrate an example host device 140 in more detail.

Providing a VMLM 152 that is external to the respective host device 140's execution environment resources to perform load data analysis and decision making for the host device 140 separates the resources allocated to the VMs 148 from the resources used for VM load monitoring and management. This separation frees the physical machine resources of the host device 140 for use by the VMs 148.

A VMLM 152 may obtain VM load data for the VMs 148 executing on the respective host device 140 and analyze the VM load data to determine current load behavior for the VMs 148 on the host device 140, for groups of VMs 148 on the host device 140, or for the host device 140 as a whole. In some embodiments, the current load behavior for the host device 140 may also be analyzed in light of previous load behavior for the host device 140 to predict future behavior of the VMs or groups of VMs on the for the host device 140. The VMLM 152 may also make VM management decisions (e.g., launch decisions, migration decisions, etc.) for the respective host device 140 based at least in part on the current or predicted load behavior for the host device 140 as determined by the analysis.

The provider network 100 may provide one or more services 104 implemented by computer systems comprising one or more computing devices on the provider network 100 that provide APIs via which customers 190 may request launches of VMs 148 of different types and with different resource requirements for their respective provider network implementations, for example for their private networks 110 on the provider network 100, via an intermediate network 170 such as the Internet. Once a launch request is approved and a suitable host device 140 is identified, a VM 148 (or a group of VMs) may be installed on the host device 140 according to the customer's requirements. The VM(s) 148 then appears as a resource instance 118 in the client's private network 110.

When a provider network service 104 receives a VM launch request from a customer 190 (or from some other requestor, such as another provider network service), the provider network service 104 may send a request for an available a host device 140 that will support the resource requirements of the VM(s) to a control plane process 106. The control plane process 106 may then send launch requests to the VMLMs 152 of one or more host devices 140 to attempt to locate a host device 140 with sufficient capacity to support the resource requirements of the VM(s).

When a VMLM 152 receives a launch request from the control plane process 106, the VMLM 152 may examine current and/or predicted load behavior for the respective host device 140 as determined from analysis of the VM load data for the host device to determine if the host device 140 has the capacity to support the VM(s) as requested. The VMLM 152 then responds to the control plane process 106 to indicate whether or not the VM(s) can be launched on its respective host device 140.

The control plane process 106 may query one or more of the VMLMs 152 to identify a target host device 140 for the requested VM(s). Upon identifying a target host device 140, the control plane process 106 notifies the requesting service 104 identifying the target host device 140. One or more VMs 148 as specified by the customer may then be installed on the target host device 140 and configured as resource instance(s) 118 in the client's private network 110.

In addition to responding to VM launch requests, the VMLMs 152 associated with the host devices 140 in the provider network 100 may initiate VM migration requests. A VMLM 152 may monitor current and/or predicted load behavior for the respective host device 140 as determined from analysis of the VM load data for the host device. Upon detecting that current or predicted load may exceed a threshold for the respective host device 140, the VMLM 152 may send a migration request to a control plane process 106 to request that one or more VMs be migrated from the host device 140 to another host device 140 on the provider network 100.

In some embodiments, the VMLMs 152 on the provider network 100 may use a dedicated communications channel (e.g. a dedicated network substrate) to communicate to the provider network control plane processes 106 and/or to other VMLMs 152 on the provider network 100.

Figure 15:
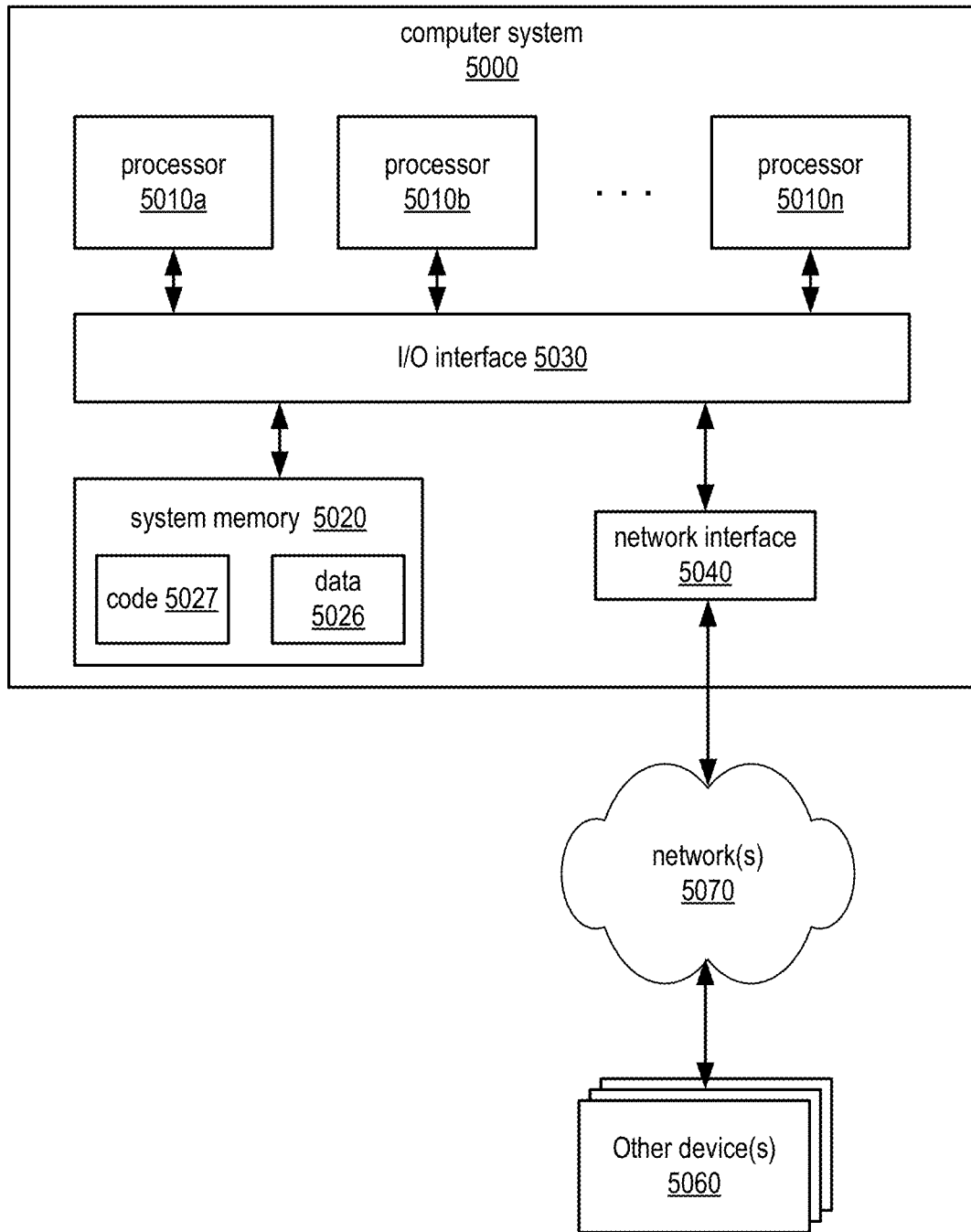
FIG. 15 is a block diagram illustrating an example computer system that may be used in some embodiments.

FIG. 2A illustrates a host device with a VM load monitor system, according to some embodiments. The host device 240 is a computer system that provides an execution environment 242 for virtual machines (VMs) 248 in a provider network environment. Host device 240 may, for example, be a rack-mount server, a blade server, a stand-alone server, or a system on a chip (SoC). An example computer system that may be used as a host device 240 is illustrated in FIG. 15. The execution environment 242 provided by the host device 240 includes hardware (e.g., processors, memory, storage space, network interfaces, etc.) and software (e.g., operating system, virtualization software, etc.) components of the host device 240 in which the VMs 248 execute. The execution environment 242 provides hardware and software resources (e.g., computation (e.g., processor) resources, memory space, storage (e.g., disk) space, networking (e.g., network bandwidth or throughput) resources, multithreading resources, etc.) that may be used by the VMs 248 during execution on the host device 240.

VMs 248A-248n may execute in slots 246A-246N on host device 240 according to hardware virtualization technology that enables multiple operating systems to run concurrently on the host device 240. While FIG. 2A shows a VM 248 executing in each slot 246, one or more, or all, of the slots 246 on a given host 240 may be empty (i.e., not provisioned with a VM 248). A hypervisor, or virtual machine monitor (VMM) 244, on the host device 240 presents the VMs 248A-248n on the respective host 240 with a virtual platform and monitors the execution of the VMs 248A-248n on the host 240. The VMM 244 and VMs 248A-248n may be executed by components of the host device 240, for example processor(s) and memory of the host device 240, represented in FIG. 2A as an execution environment 242. Each VM 248 on the host device 240 may be provided with one or more IP addresses; the VMM 240 on the host device 240 may be aware of the IP addresses of the VMs 248A-248n on the host device 240. In some embodiments, the host device 240 may also include a network interface 243 that processes network traffic (e.g., packet flows) between VMs 248A-248n on the host device 240 and the provider network.

Figure 2B:
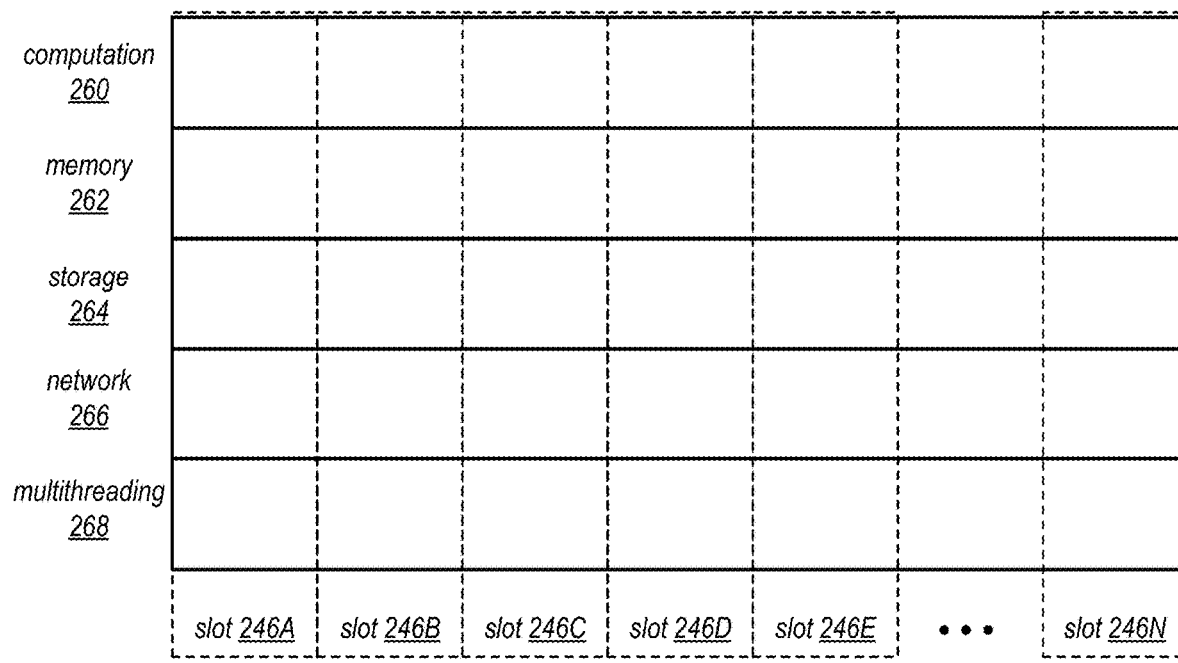
Figure 3:
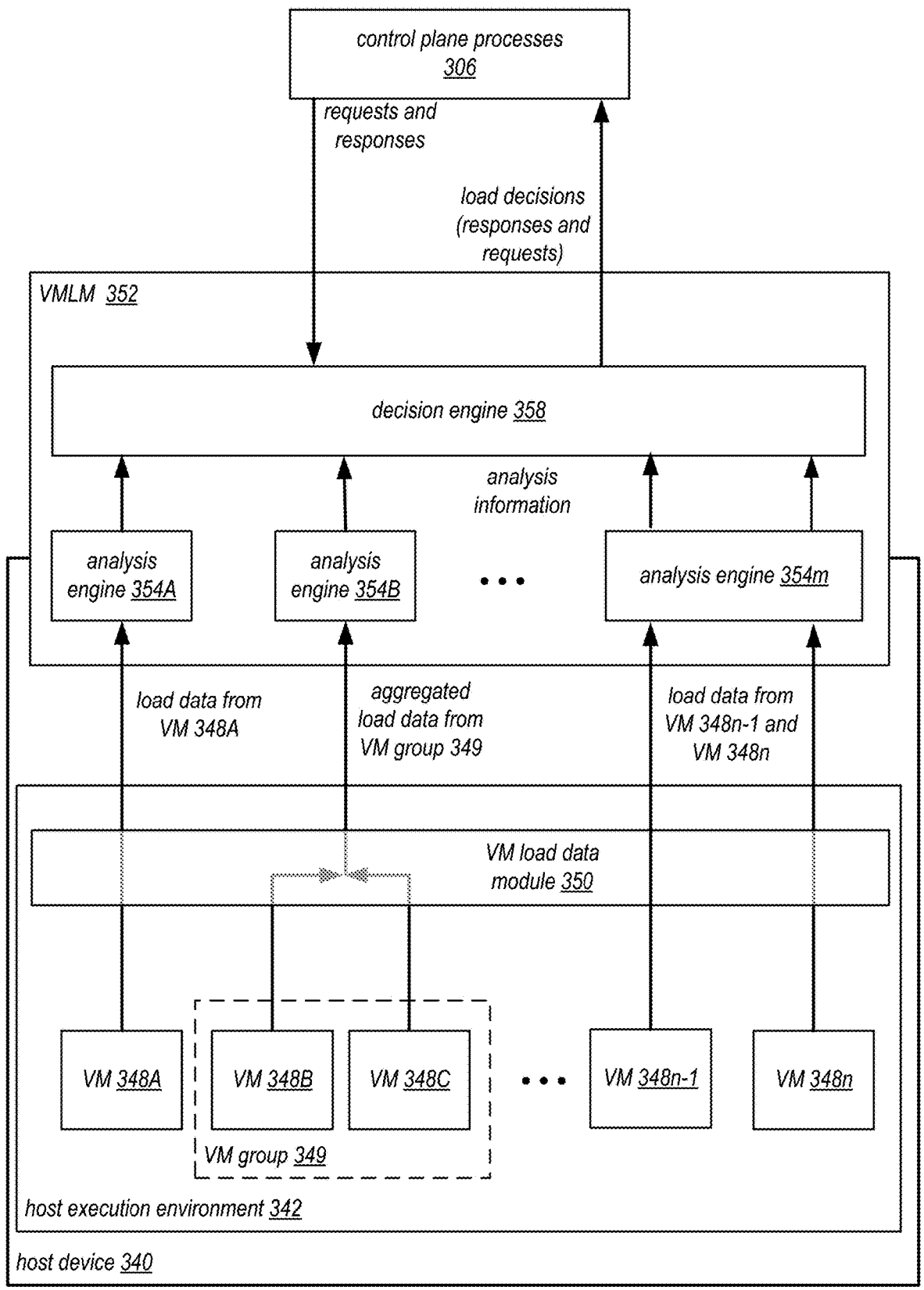
FIG. 3 illustrates a VM load monitor system in more detail, according to some embodiments.

As illustrated in FIG. 2B, each slot 246 on host device 240 may be provisioned with some amount of resources (computation 260 (e.g., processor) resources, memory 262 space, storage 264 (e.g., disk) space, networking 266 (e.g., network bandwidth or throughput) resources, multithreading 268 resources, etc.) on the host device 240. In some embodiments, each of the N slots in host device 240 may be provisioned with the same amount of resources of the host device 240. In some embodiments, however, different slots 246 may be provisioned with different amounts of the various resources of the host device 240. Each VM 248 executing in a slot 246 on host device 240 may thus be provisioned with resources (computation 260 (e.g., processor) resources, memory 262 space, storage 264 (e.g., disk) space, networking 266 (e.g., network bandwidth or throughput) resources, multithreading 268 resources, etc.) in the execution environment 242 of the host device 240. In some embodiments, each VM 248 may be provisioned with the same amount of resources of the host device 240. In some embodiments, however, different VMs 248 may be provisioned with different amounts of the various resources of the host 240. In some embodiments groups of two or more VMs 248 may be provisioned with an amount of resources available for the group. In some embodiments, a maximum amount of resources that can be used by a VM 248 or group of VMs on a host device may be set according to internal load thresholds defined by the service provider. However, in some embodiments, a maximum amount of resources that can be used by a customer's VM 248 or group of VMs on a host device can be specified according to a service level agreement (SLA) between the customer and the service provider that provides the provider network.

The host device 240 may implement a VM load monitor system as described herein. The VM load monitor system may include a VM load monitor (VMLM) 252 that monitors VM load on the host device 240. The VMLM 252 may be a programmable device that is external to the host device 240's execution environment resources. As non-limiting examples, VMLM 252 may be a field-programmable gate array (FPGA) integrated circuit (IC) external to the host device 240's execution environment resources, a peripheral card with a general purpose CPU or GPU executing VM load monitor software external to the host device 240's execution environment resources, or an application-specific integrated circuit (ASIC) external to the host device 240's execution environment resources. The VM load monitor system may also include a VM load data module 250 that collects load data for VMs 248 or groups of VMs executing on the host device 240 and communicates the collected VM load data to the VMLM 252. The VM load data module 250 may, for example, be implemented as a software module that executes in the execution environment 242 of the host device 240. In some embodiments, the VM load data module 250 collects the VM load data and sends the VM load data to the VM load monitor 252 in a fire-and-forget way, and otherwise does not participate in the VM load analysis or decision making. Different types of VM load data can be collected and sent by the VM load data module 250, depending on the configurations of the VMs 248. Examples of VM load data that may be collected by the VM load data module 250 may include, but are not limited to, network inbound and outbound throughput load data, CPU load data, swap usage data, load data for multithreading resources such as the number of soft locks used, and disk usage load data such as the number/size of disk reads/writes. The on-host processing overhead of the VM load data by the VM load data module 250 is minimal. The VM load data module 250 may simply collect and send the raw (or minimally processed) VM load data for each VM 248 or group of VMs 248 executing on the host device 240 to the VM load monitor 252. The VM load data for a VM 248 or VM group may, for example, be identified by a process ID, user/customer ID, or other identifier so that the VM load monitor 252 can identify the source VM 248 or VM group of particular load data.

In some embodiments, the VM load data collected by the VM load data module 250 may be sent to the VM load monitor 252 via a dedicated communications channel 251 that supports the throughput required for the data transfer. As non-limiting examples, a dedicated bus (e.g., a PCI Express (Peripheral Component Interconnect Express) bus) or memory-mapped I/O through a shared memory may be used as the communications channel 251. By using a dedicated communications channel 251 for the VM load data, the VM load data is not sent over the same communications channels on the host device 240 (e.g., the host device's network interface 243) as data input/output of the VMs 248.

The VM load monitor 252 obtains the VM load data via the dedicated communications channel 251, analyzes the VM load data, and makes VM management decisions (e.g., launch VM and/or migrate VM decisions) based on the analysis. The VM load data obtained by the VM load monitor 252 is input to analysis engines 254 that execute on the VM load monitor 252. The VMs 248 executing on a given host device may be heterogeneous; that is, different ones or groups of the VMs 248 may be of different types or configurations that may have different load characteristics. For example, some VMs 248 may be compute-intensive, some may be GPU-intensive, some may be network bandwidth-intensive, some may be disk-intensive, and so on. Thus, in some embodiments, different ones of the analysis engines 254 may implement different load analysis algorithms that perform load analysis for particular types of VMs 248 (e.g. compute-intensive, GPU-intensive, network bandwidth-intensive, etc.). Using different load analysis algorithms for different VM types allows the load analysis and decision making to be tailored to and thus more accurate for the different VM types when compared to using a generic load analysis algorithm.

The load analysis engines 254 may output load analysis information to a decision engine or engines 258 executing on the VM load monitor 252. The load analysis information may also be stored in a load data store 256 in memory of the VM load monitor 252. The output of the analysis engines 254 includes information indicating the current load behavior of each VM 248 or group of VMs on the host device 240. In some embodiments, the load data for each VM 248 or group of VMs may be processed in parallel by the analysis engines 254 so that the output of the analysis engines 254 provides a point-in-time snapshot of the current load behavior across all VMs 248 and groups of VMs on the host device 240.

In some embodiments, the analysis engines 254 may analyze the current load behavior of a VM 248 or group of VMs in view of previous load behavior information for the VM 248 or group of VMs to estimate and output trends in load behavior for the VM 248 or group of VMs over time. The previous load behavior information for the VM 248 or group of VMs may be read from local caches of the analysis engines 254, or alternatively from the load data store 256. The analysis of the current load behavior in light of the previous load behavior may be used by the VM load monitor system to predict future behavior of the VMs 248 or groups of VMs on the host device 240 in addition to determining current load behavior so that at least some VM management decisions may be made proactively before the load behavior of a VM 248 or group of VMs on the host device 240 becomes problematic.

The decision engine(s) 256 may use the load analysis information generated by the analysis engines 254 to make VM management decisions for the host device 240. Examples of VM management decisions include, but are not limited to, whether current load is low enough (or whether predicted load should remain low enough) to accept a request to launch a VM 248 or group of VMs on the host device 240, or whether a VM 248 or group of VMs needs to be migrated from the host device 240 due to current (or predicted) load behavior. The VM load monitor 252 sends the VM management decisions (e.g., accept/reject launch requests, requests to migrate VMs, etc.) to control plane processes 206.

The VM load monitor 252 may then perform one or more actions related to a particular VM management decision (launch VM, migrate VM, etc.). For example, for a VM launch request that is accepted, the VM load monitor 252 may be updated with or activate an analysis engine 254 that implements a particular analysis algorithm for the type of VM 248 that is launched. As another example, for a VM migration request that is accepted, the VM load monitor 252 may deactivate an analysis engine 254 for the VM 248 that is migrated, and may also purge at least some of the load data that was previously stored in load data store 256 for the migrated VM 248. The VM load data module 250 may be updated for VM launches and VM migrations so that the VM load data module 250 has current knowledge of the VMs 258 that are executing on the host device 240 that it needs to collect load data for.

FIG. 3 illustrates a VM load monitor system in more detail, according to some embodiments. A host device 340 may execute multiple VMs 348A-348n in its execution environment 342. In some embodiments, two or more of the VMs 348 may form a VM group 349. A VMLM 352 for the host device 340 may implement multiple analysis engines 354A-354m and one or more decision engines 358. Two or more of the analysis engines 354 may implement different analysis algorithms to support analysis of load data from different types of VMs 348 executing on the host device 340. The host device 340 may also execute a VM load data module 350 in its execution environment 342. VM load data module 350 may collect load data for the VMs 348 and send the load data to the VMLM 352 via a dedicated communications channel. As non-limiting examples, a dedicated bus (e.g., a PCI Express (Peripheral Component Interconnect Express) bus) or memory-mapped I/O through a shared memory may be used as the dedicated communications channel.

As shown in FIG. 3, VM load data module 350 may collect load data for a VM 348A and send the load data to be processed by an analysis engine 354A of VMLM 352. In some embodiments, VM load data module 350 may collect load data for two or more VMs of the same type (e.g., VMs 348n-1 and 348n) and send the load data to be processed in parallel by an analysis engine 354m of VMLM 352. In some embodiments, VM load data module 350 may collect load data for VMs 348B and 348C in VM group 349, aggregate the load data, and send the aggregated load data to be processed by an analysis engine 354B of VMLM 352. For example, aggregated load data for a VM group 349 may be processed by an analysis engine 354B based on a Service Level Agreement (SLA) between the customer that owns the VMs in the group 349 and the service provider that provides the provider network.

The load analysis engines 354A-354m may output load analysis information to a decision engine or engines 358 executing on the VM load monitor 352. The load analysis information may also be stored in a load data store in memory of the VM load monitor 352. The output of the analysis engines 354A-354m includes information indicating the current load behavior of each VM 348 or VM group 349 on the host device 340. In some embodiments, the load data may be processed in parallel by the analysis engines 354A-354m so that the output of the analysis engines 354A-354m provides a point-in-time snapshot of the current load behavior across all VMs 348 and VM groups 349 on the host device 340.

In some embodiments, the analysis engines 354A-354m may analyze the current load behavior of a VM 348 or VM group 349 in view of previous load behavior information for the VM 348 or VM group 349 to estimate and output trends in load behavior for the VM 348 or VM group 349 over time. The previous load behavior information for the VM 348 or VM group 349 may be read from local caches of the analysis engines 354A-354m, or alternatively from the load data store on the VMLM 352. The analysis of the current load behavior in light of the previous load behavior may be used by the VM load monitor system to predict future behavior of the VMs 348 or VM groups 349 on the host device 340 in addition to determining current load behavior so that at least some VM management decisions may be made proactively before the load behavior of a VM 348 or VM group 349 on the host device 340 becomes problematic.

The decision engine(s) 356 may use the load analysis information generated by the analysis engines 354A-354m to make VM management decisions for the host device 340. Examples of VM management decisions include, but are not limited to, whether current load is low enough (or whether predicted load should remain low enough) to accept a request to launch a VM 348 or VM group 349 on the host device 340, or whether a VM 348 or VM group 349 needs to be migrated from the host device 240 due to current (or predicted) load behavior. The VM load monitor 352 sends the VM management decisions (e.g., accept/reject launch requests, requests to migrate VMs, etc.) to control plane processes 306.

The VM load monitor 352 may then perform one or more actions related to a particular VM management decision (launch VM, migrate VM, etc.). For example, for a VM launch request that is accepted, the VM load monitor 352 may be updated with or activate an analysis engine 354 that implements a particular analysis algorithm for the type of VM 348 that is launched. As another example, for a VM migration request that is accepted, the VM load monitor 352 may deactivate an analysis engine 354 for the VM 348 that is migrated, and may also purge at least some of the load data that was previously stored for the migrated VM 348. The VM load data module 350 may be updated for VM launches and VM migrations so that the VM load data module 350 has current knowledge of the VMs 358 that are executing on the host device 340 that it needs to collect load data for.

Figure 4:
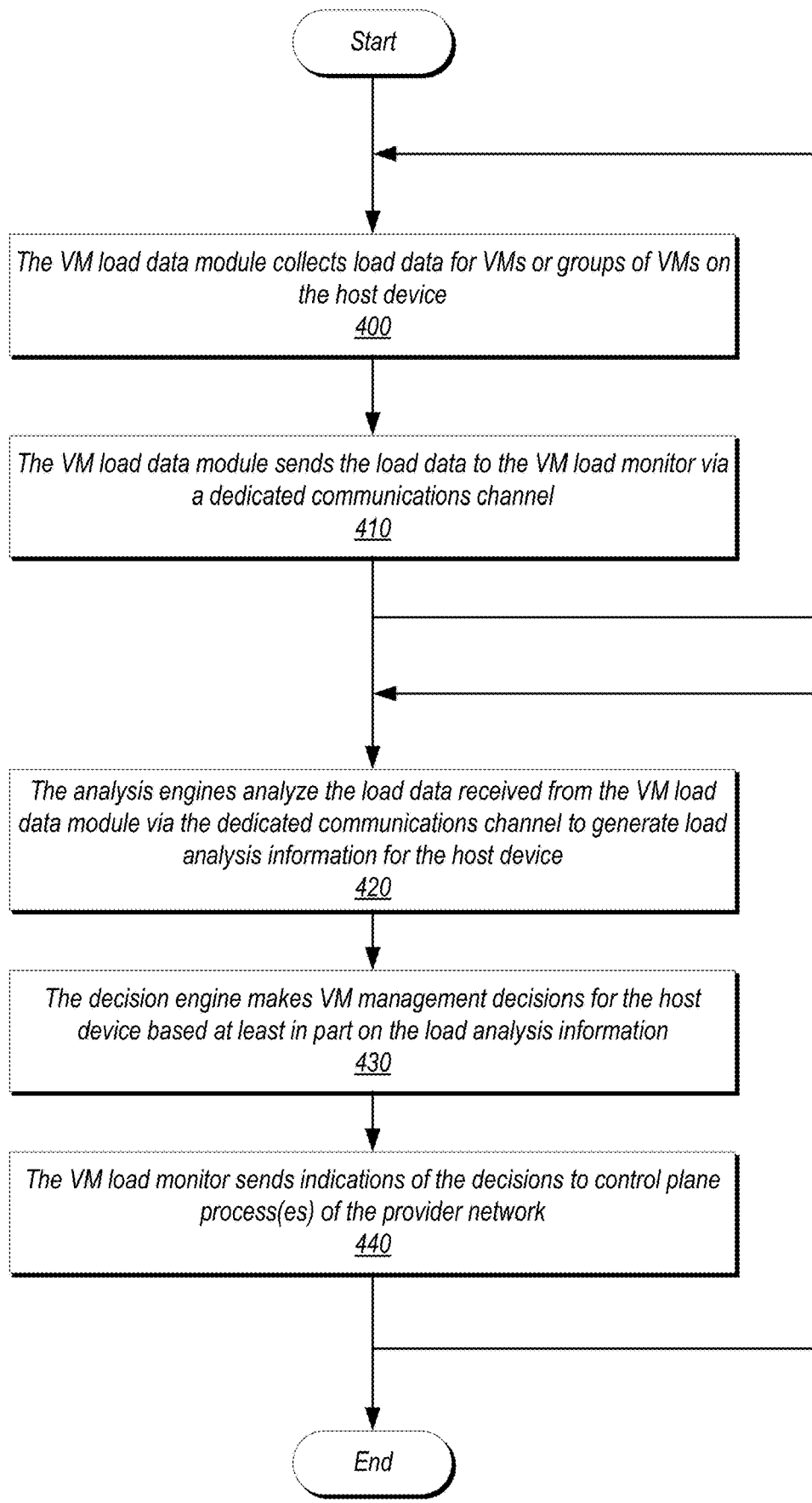
FIG. 4 is a high-level flowchart of a method of operation for a VM load monitor system in a provider network environment, according to some embodiments.

FIG. 4 is a high-level flowchart of a method of operation for a VM load monitor system in a provider network environment, according to some embodiments. As indicated at 400, the VM load data module collects load data for VMs or groups of VMs on the host device. As indicated at 410, the VM load data module sends the load data to the VM load monitor via a dedicated communications channel. As indicated at 420, the analysis engines analyze the load data received from the VM load data module via the dedicated communications channel to generate load analysis information for the host device. As indicated at 430, the decision engine makes VM management decisions for the host device based at least in part on the load analysis information. As indicated at 440, the VM load monitor sends indications of the decisions to control plane process(es) of the provider network.

Use cases of the VM load monitor systems may include, but are not limited to, making VM management decisions for host devices regarding VM launches and VM migrations.

Figure 5:
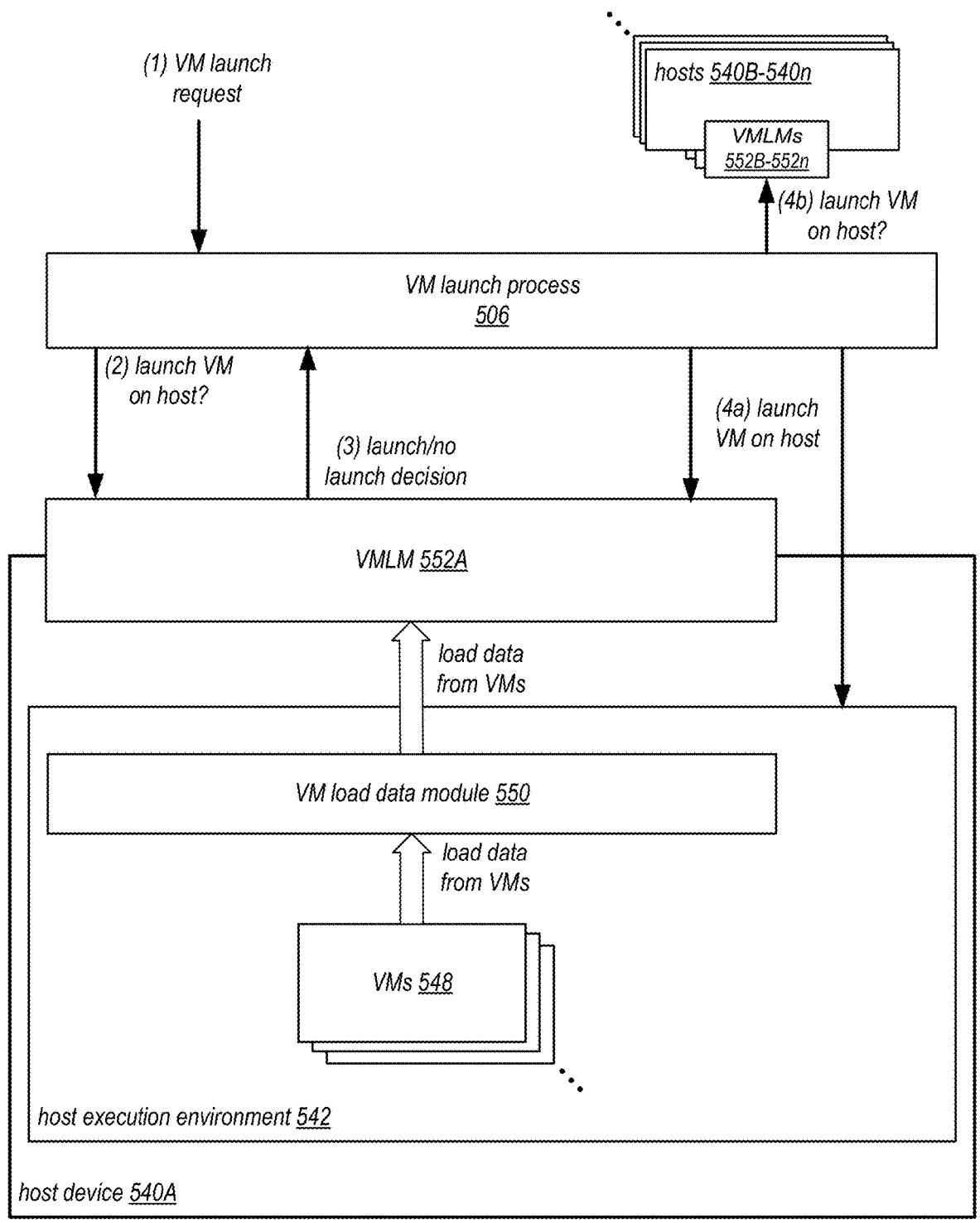
FIG. 5 illustrates a VM launch decision process performed in part by a VM load monitor system, according to some embodiments.

FIG. 5 illustrates a VM launch decision process performed in part by a VM load monitor system, according to some embodiments. A host device 540A may be executing one or more VMs 548 in its execution environment 542. A VM load data module 550 executing in the execution environment 542 may be collecting load data for the VMs 548 and sending the load data to the VMLM 552A of host device 540A for analysis by the analysis engine(s) executing on the VMLM 552A. At (1), a VM launch process 506 of the provider network control plane may receive a VM launch request, for example from a customer of the provider network that wants to start one or more new VMs as instances in their provider network implementation. At (2), the VM launch process 506 messages the VMLM 552A of host device 540A for feedback regarding the VM launch request. The VM launch process 506 may provide information about the VM(s) to be launched to the VMLM 552A, for example the number and type(s) of VMs that are to be launched and expected load requirements for the VM(s). A decision engine of the VMLM 552A then evaluates the launch request in light of current or predicted VM load behavior for the host device 540A as generated by the analysis engines of the VMLM 553A to determine whether or not the requested VM(s) can be launched on the host device 540A. At (3), the decision (i.e., launch/no launch) is then sent back to the VM launch process 506. If the decision indicates that the VM(s) can be launched on the host device 540A, then the VM launch process 506 launches the VM(s) on host device 540A and updates the VMLM 552A if necessary as indicated at (4a). If the decision indicates that the VM(s) cannot be launched on the host device 540A, then the VM launch process 506 may message a VMLM 552 of another host device 540 for feedback regarding the VM launch request as indicated at (4b). The VM launch process 506 may continue to message VMLMs 552 until a host device 540 is located that has the capacity to host the VM(s) as specified by the customer's VM launch request.

Note that VM launch requests may be initiated in other ways or by other entities than by a customer of the provider network. For example, a VM migration request from a VMLM 552 of a host device 540 may initiate VM launch requests to one or more other VMLMs 552 of other host devices 540 to locate host device(s) 540 that can host the VM(s) to be migrated.

Figure 6:
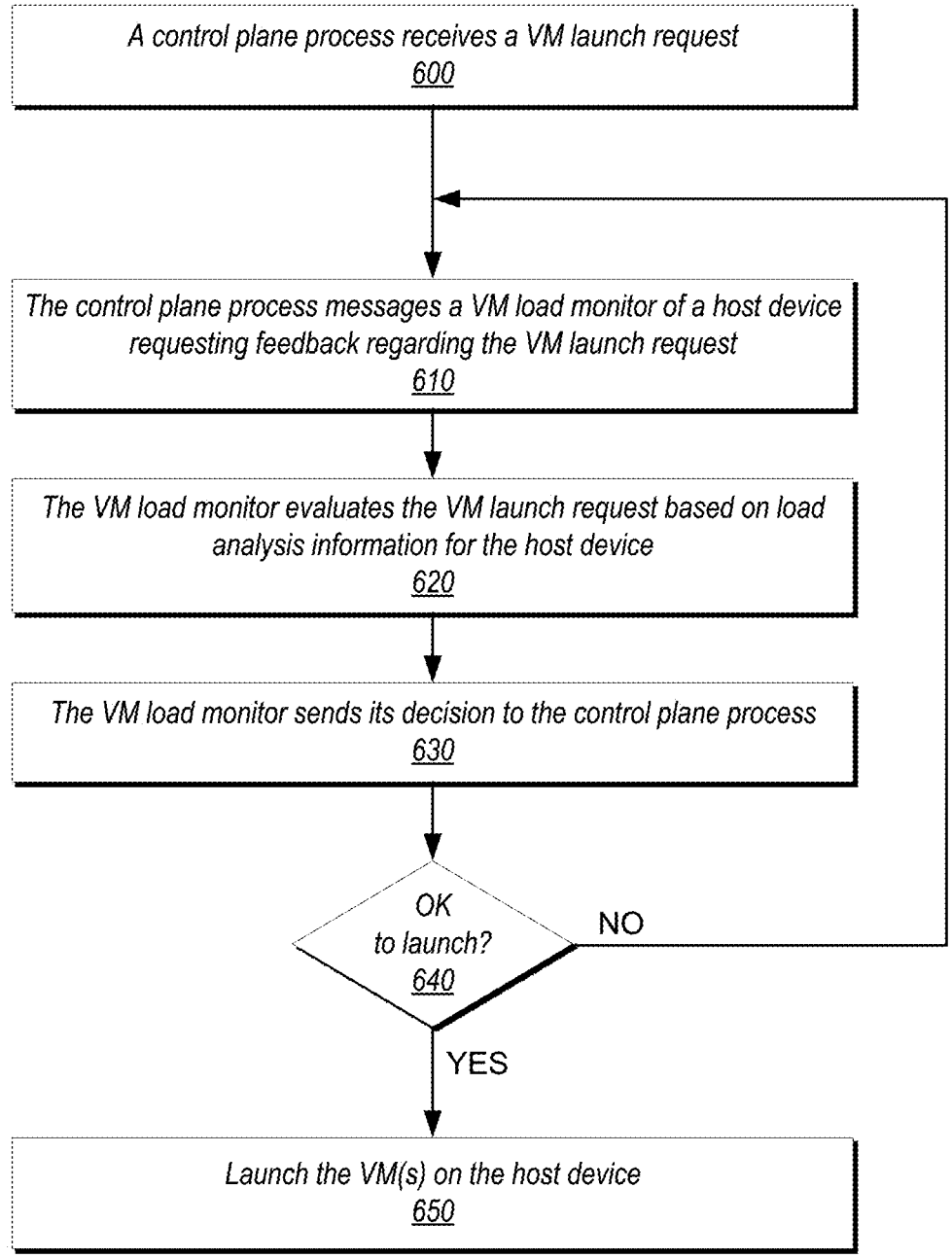
FIG. 6 is a flowchart of a VM launch decision process performed in part by a VM load monitor system, according to some embodiments.

FIG. 6 is a flowchart of a VM launch decision process performed in part by a VM load monitor system, according to some embodiments. As indicated at 600, a control plane process (e.g., a VM launch process) executing in the control plane of a provider network receives a VM launch request. For example, the VM launch request may be received from a customer of the provider network that wants to start one or more new VMs as instances in their provider network implementation. As indicated at 610, the control plane process messages a VM load monitor of a host device requesting feedback regarding the VM launch request. As indicated at 620, the VM load monitor evaluates the VM launch request based on load analysis information for the host device to determine if the host device can or cannot host the requested VM(s). As indicated at 630, the VM load monitor sends its decision to the control plane process. At 640, if the decision indicates that it is OK to launch the VM(s) on the host device, then as indicated at 650 the control plane process launches the VM(s) on the host device. At 640, if the decision indicates that the VM(s) cannot be launched on the host device, then the method may return to element 610, where the control plane process may message the VM load monitor of a different host device requesting feedback regarding the VM launch request.

Figure 7:
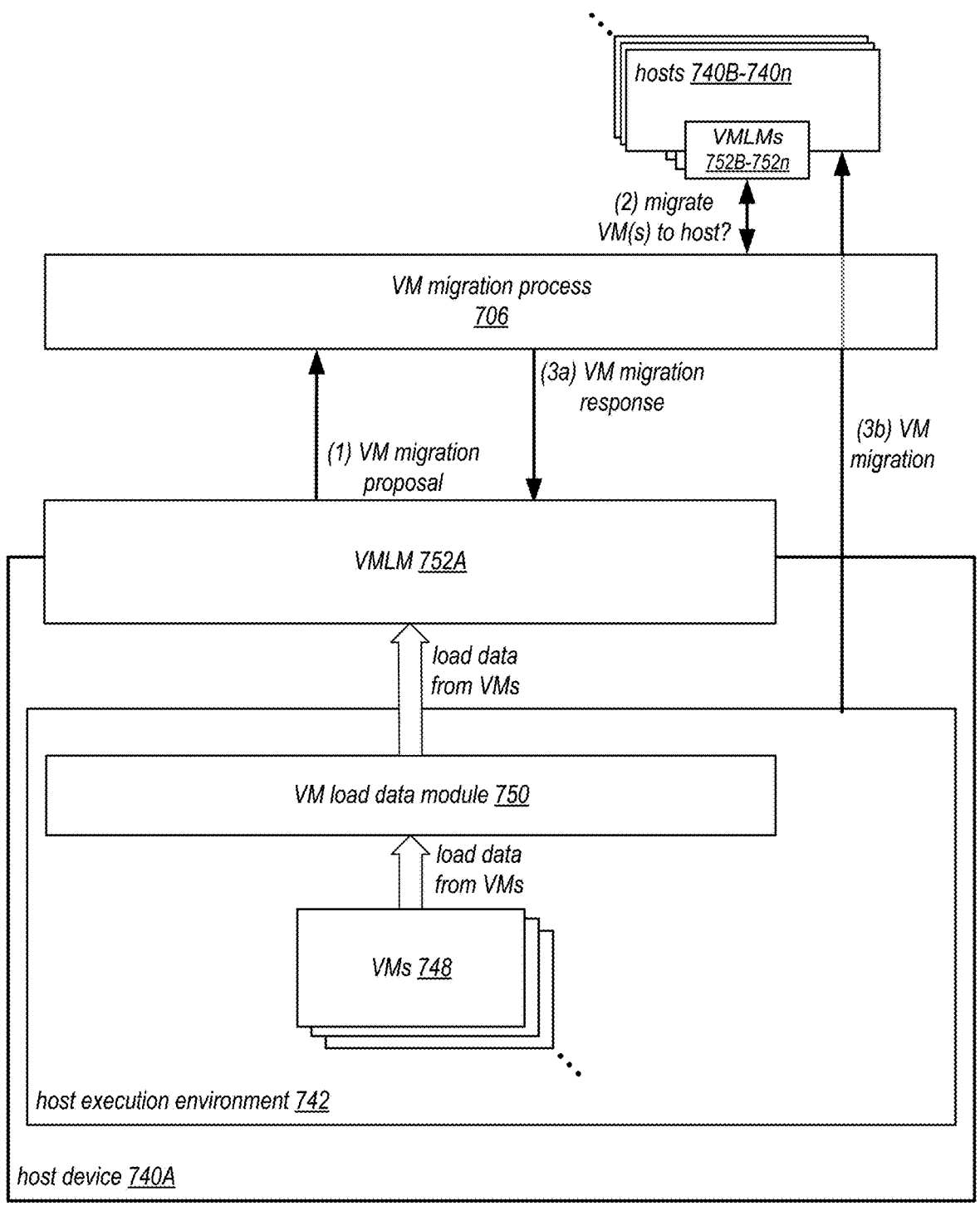
FIG. 7 illustrates a VM migration process initiated by a VM load monitor system, according to some embodiments.

The VM load monitor system may proactively initiate live migrations of VMs from a source host device to a destination host device based on analysis of current or predicted VM load behavior on the source host device. FIG. 7 illustrates a VM migration process initiated by a VM load monitor system, according to some embodiments. A host device 740A may be executing VMs 748 in its execution environment 742. A VM load data module 750 executing in the execution environment 742 may be collecting load data for the VMs 748 and sending the load data to the VMLM 752A of host device 740A for analysis by the analysis engine(s) executing on the VMLM 752A. The VMLM 752A may determine that one or more of the VMs 748 currently executing on the host device 740A need to be migrated from the host device 740A based on the VM load analysis information generated by the analysis engine(s).

In some embodiments, the VMLM 752A may select the one or more VMs 748 to be migrated based on the load analysis information generated by the analysis engines executing on the VMLM 752A. The VM(s) 748 are selected for migration in order to maintain a certain level of resource load (e.g. network load) per VM/customer on the host device 740A. In some embodiments, the VMLM 752A may select VM(s) 748 for migration that have exhibited relatively low load statistics for a period of time when compared to other VMs executing on the host device 740A. The relatively low load VM(s) 748 on the host device 740A can be migrated to allow the relatively high load VMs 748 (e.g., VMs 748 with compute-intensive, GPU-intensive, and/or network bandwidth-intensive workloads) more access to the host device 740A's available resources (e.g. network bandwidth, processors (central processing unit (CPU), graphics processing unit (GPU), etc.), memory, disk, etc.). Further, relatively low load VMs 748 are prone to fewer errors when live migrated than high load VMs 748, as low load VMs 748 are less likely to use host device resources in the pre-migration or post-migration state. Further, migrating low load VMs 748 has less customer impact than would migrating high load VMs 748.

At (1), the VMLM 752 may send a VM migration proposal to a VM migration process 706 executing in the control plane of the provider network. The VM migration proposal may include information indicating the VM(s) 748 (or group(s) of VMs) that the VMLM 752A has determined should be migrated. At (2), the VM migration process 706 may then query the VMLMs 752B-752n of host devices 740B-740n to find a suitable destination host device 740 for the VM(s) 748 that are to be migrated, for example using a method similar to the method as illustrated in FIG. 6. Upon locating a suitable destination host device 740, at (3a) the VM migration process 706 may respond to the VM migration proposal indicating that the VM(s) 748 can be migrated. At 3(b), the VM migration process 706 may perform the migration of the VM(s) 748 to the destination host device 740. The VMLMs 752 and the VM load data modules 750 of the source and destination host devices 740 may be updated to reflect the new VM configurations of the respective host devices 740. If a suitable destination host device 740 is not found, the VM migration process 706 may notify the VMLM 752A. The VMLM 752A may then determine and send another VM migration proposal, or alternatively the VM migration process 706 may repeat the search for a suitable destination device until one is found. In some embodiments, the VM migration process 706 may migrate one or more VMs from one host device 740 to one or more other host devices 740 to make room on the host device 740 for the VM(s) that are to be migrated from host device 740A.

Note that the VM migration process 706 may receive VM migration requests from other sources; for example, a customer of the provider network may request that one or more of their VMs on a host device be migrated to a different host device. In response to these VM migration requests, the VM migration process 706 may use a method similar to the method as illustrated in FIG. 6 to locate host devices to migrate the VMs to.

A VM load monitor may also initiate VM migrations from the respective host device for other reasons than current or predicted VM load behavior. For example, in some embodiments, the VM load monitor may be aware of a maintenance schedule for its respective host device, and may proactively initiate migration of VMs from the host device in advance of scheduled maintenance. As another example, a VM load monitor may monitor host device resources used by a customer's VMs on the host device based on a service level agreement (SLA) between the customer and the service provider that provides the provider network. If the VM load monitor detects that the customer's VMs may need additional resources to satisfy the SLA, the VM load monitor may initiate migration of one or more VMs from the host device to free up resources for the customer's VMs. As another example, a VM load monitor may be aware of security requirements for VMs on the host device, for example based on a SLA between a customer and the service provider that provides the provider network. The VM load monitor may initiate migration of one or more VMs from the host device to insure that the security requirements of other VMs on the host device are met.

Figure 8:
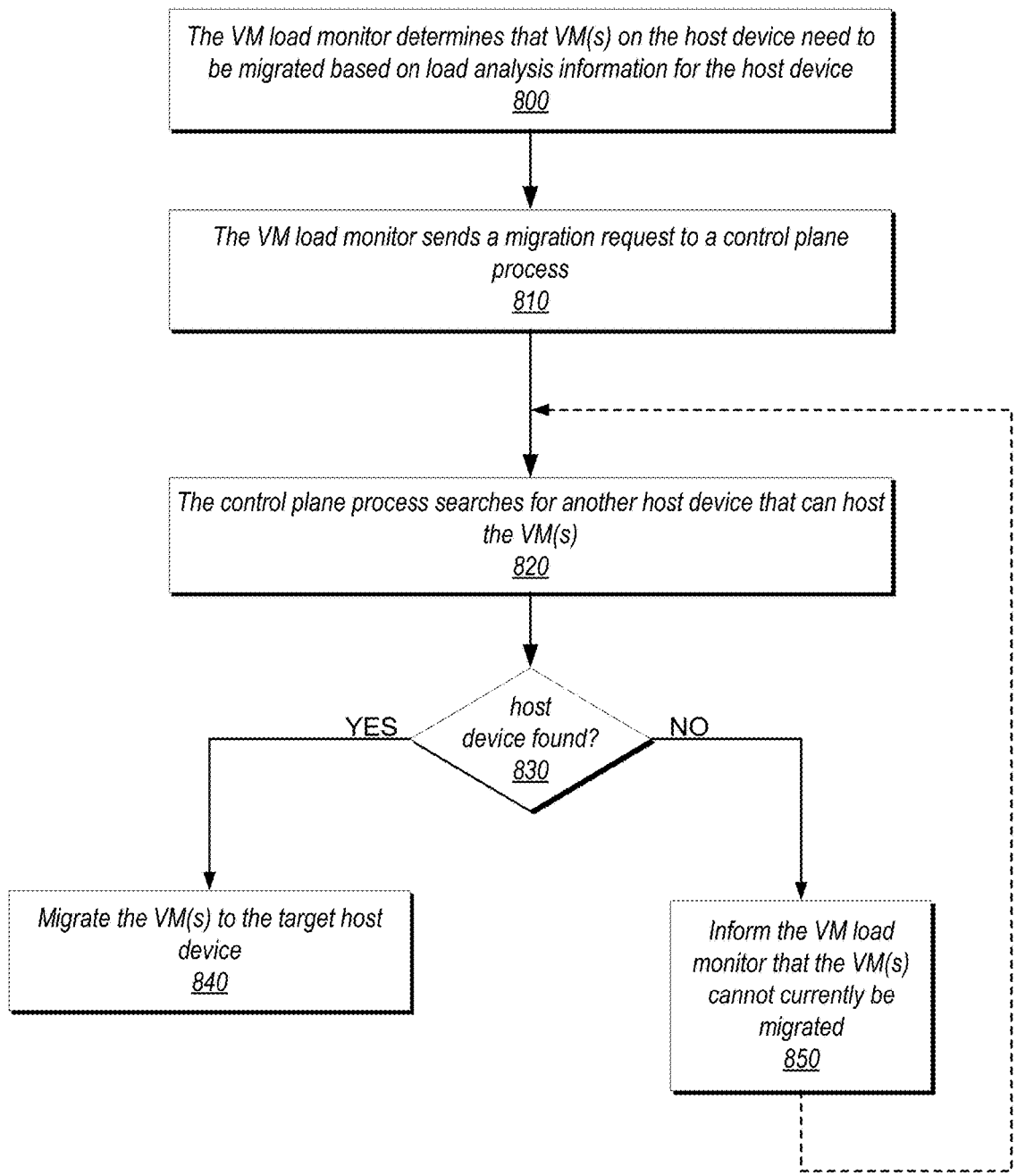
FIG. 8 is a flowchart of a VM migration process initiated by a VM load monitor system, according to some embodiments.

FIG. 8 is a flowchart of a VM migration process initiated by a VM load monitor system, according to some embodiments. As indicated at 800, the VM load monitor of a host device on the provider network determines that one or more VMs on the host device need to be migrated based on load analysis information for the host device. As indicated at 810, the VM load monitor sends a migration request to a control plane process (e.g., a VM migration process). As indicated at 820, the control plane process may search for another host device that can host the VM(s), for example using a method similar to the VM launch process as illustrated in FIG. 6. At 830, if a target host device for the migration is found, then as indicated at 840 the control plane process may migrate the VM(s) to the target host device. At 830, if a target host is not found, then the control plane process may inform the VM load monitor of the host device that the VM(s) cannot currently be migrated as indicated at 850. As illustrated by the dashed line returning from element 850 to element 820, the control plane process may continue or repeat attempts to locate a target host device for the migration until a target host device is found or the requesting VM load monitor cancels the request.

Figure 9A:
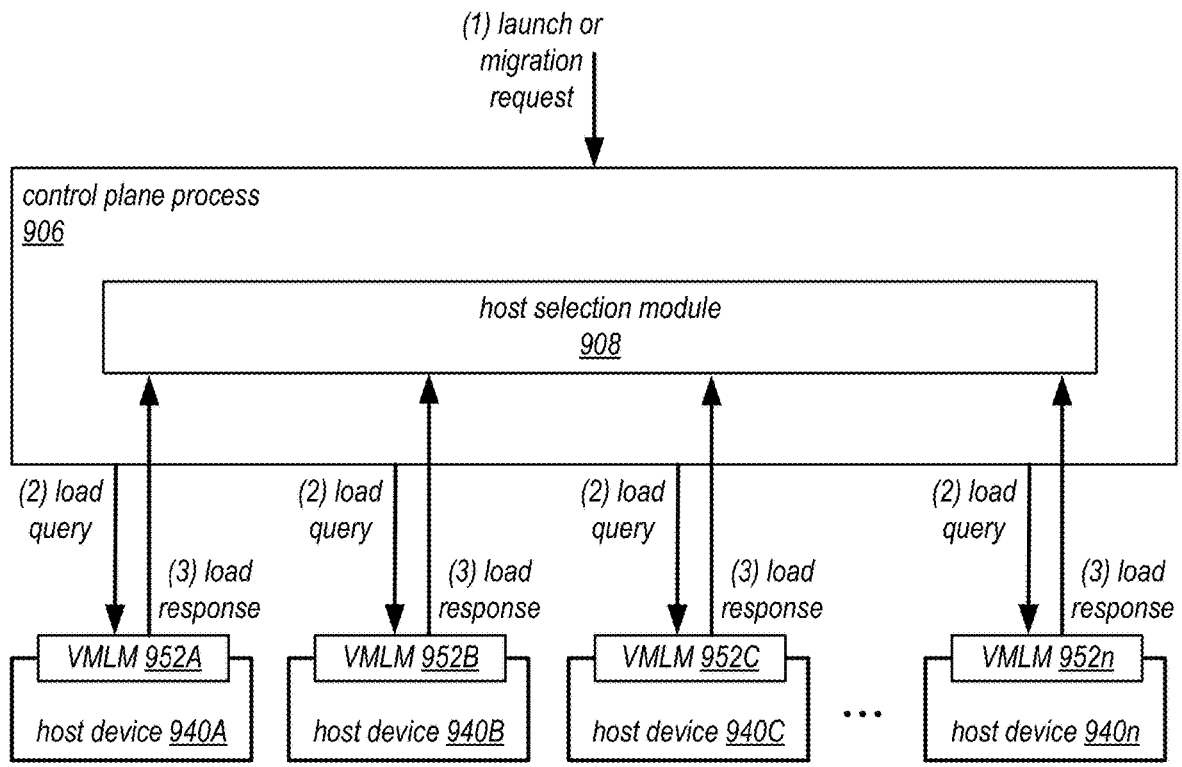
FIGS. 9A and 9B illustrate a control plane process selecting a host device based on load information obtained from two or more VM load monitor systems, according to some embodiments.
Figure 9B:
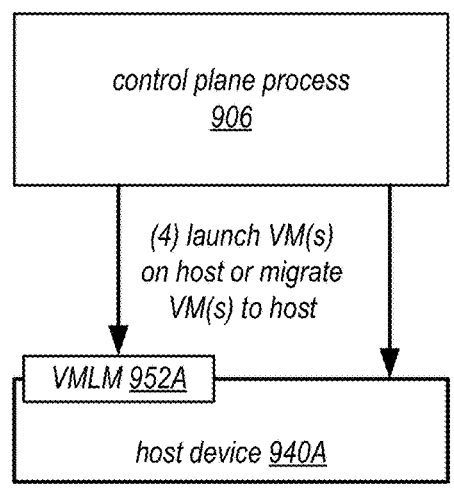

In some embodiments, a centralized entity such as a control plane process may make VM management decisions based on feedback from multiple VM load monitors. As an example, a control plane process may query multiple VM load monitors to obtain VM load information for their respective host devices. The control plane process may then analyze the VM load information to select a host device to host one or more VMs that are to be launched or migrated from another host device. FIGS. 9A and 9B illustrate a control plane process selecting a host device based on load information obtained from two or more VMLMs, according to some embodiments.

As shown in FIG. 9A, at (1), a control plane process 906 may receive a VM launch request or a VM migration request. For example, a VM launch request may be received from a customer of the provider network that wants to start one or more new VMs as instances in their provider network implementation. As another example, a VM migration request may be received from a VMLM of a host device on the provider network. In some embodiments, the request may include information indicating the specific load requirements of the VM(s) to be launched or migrated (e.g., whether the VM(s) are compute-intensive, GPU-intensive, disk-intensive, and/or network bandwidth-intensive). At (2), control plane process 906 may query multiple VMLMs 952 (952A-952n, in this example) requesting load information for their respective host devices 940 (940A-940n, in this example). At (3), VMLMs 952A-952n may respond with feedback to the control plane process 906. Each response may include an indication as to whether or not the requested VM(s) can be launched on the respective host device 940, and may also include load information for the respective host device 940. The load information for a host device 940 may include current or predicted load state or statistics as determined by the VMLM 952 of the host device 940 for one or more resources (e.g., computation resources, memory resources, disk resources, network resources, and/or graphics processing unit (GPU) resources) on the respective host device 940.

The load information received from VMLMs 952A-952n may be input to a host selection module 908 of the control plane process 906 that analyzes the load information and the specific load requirements of the VM(s) to be launched or migrated to select a host device 940 with a current or predicted load capacity that can support the workload of the VM(s) that need to be launched or migrated. As a non-limiting example, if a VM to be launched or migrated is computation-intensive, then a host device 940 may be selected that has a low (or the lowest) current computation workload. As shown in FIG. 9B, at (4), once a target host device 940 is selected (in this example, host device 940A is selected), the VM(s) may be launched on or migrated to the host device 940A.

Figure 10:
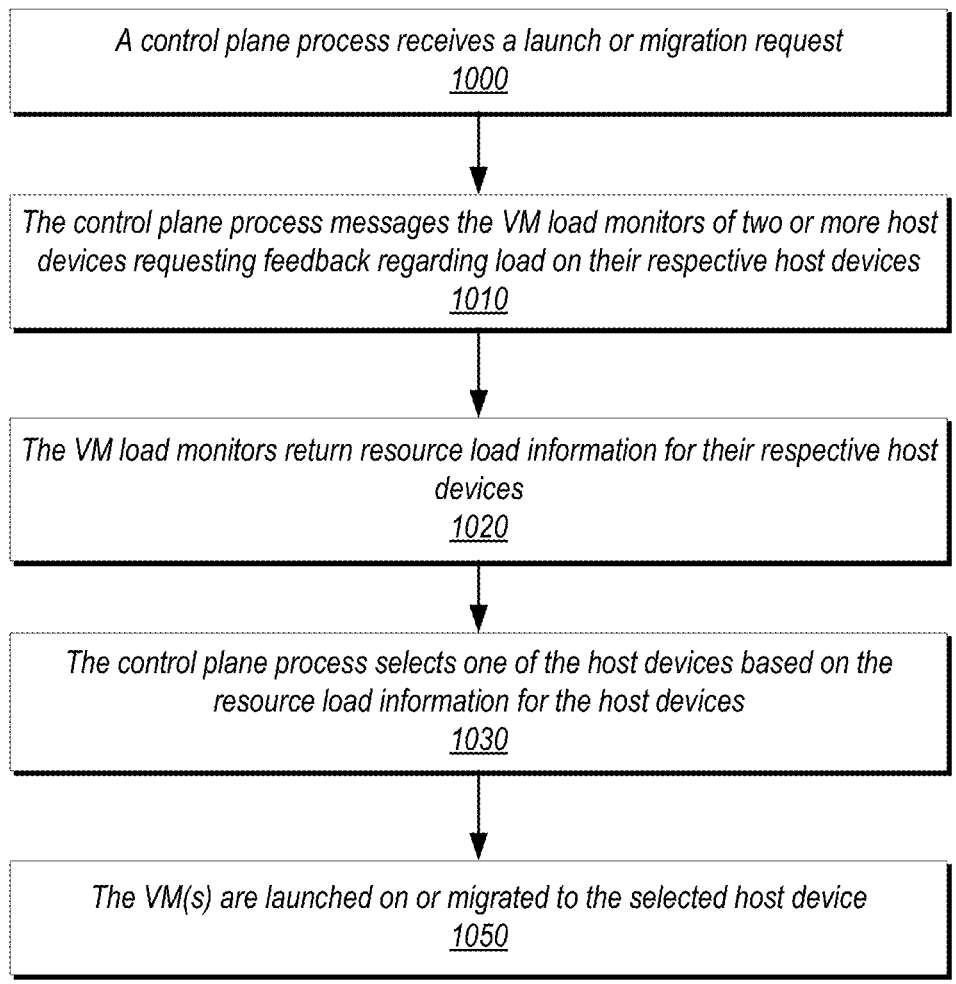
FIG. 10 is a flowchart of a method for selecting a host device based on load information obtained from two or more VM load monitor systems, according to some embodiments.

FIG. 10 is a flowchart of a method for selecting a host device based on load information obtained from two or more VM load monitor systems, according to some embodiments. As indicated at 1000, a control plane process (e.g., a VM launch process or VM migration process) executing in the control plane of a provider network receives a request to launch or migrate one or more VMs. The request may include information indicating the specific load requirements of the VM(s) to be launched or migrated. As indicated at 1010, the control plane process messages the VM load monitors of two or more host devices requesting feedback regarding load on their respective host devices. As indicated at 1020, the VM load monitors return resource load information for their respective host devices. The resource load information for a host device may include current or predicted load state or statistics for one or more resources (e.g., computation resources, memory resources, disk resources, network resources, and/or graphics processing unit (GPU) resources) on the respective host device. As indicated at 1030, the control plane process selects one of the host devices based on the load information for the host devices. The control plane process analyzes the load information and the specific load requirements of the VM(s) to be launched or migrated to select a host device with a current or predicted load capacity that can support the workload of the VM(s) that need to be launched or migrated. As indicated at 1040, the control plane process then launches the VM(s) on, or migrates the VM(s) to, the selected host device.

Example Provider Network Environment

This section describes example provider network environments in which embodiments of the methods and apparatus described in reference to FIGS. 1 through 10 may be implemented. However, these example provider network environments are not intended to be limiting.

Figure 11:
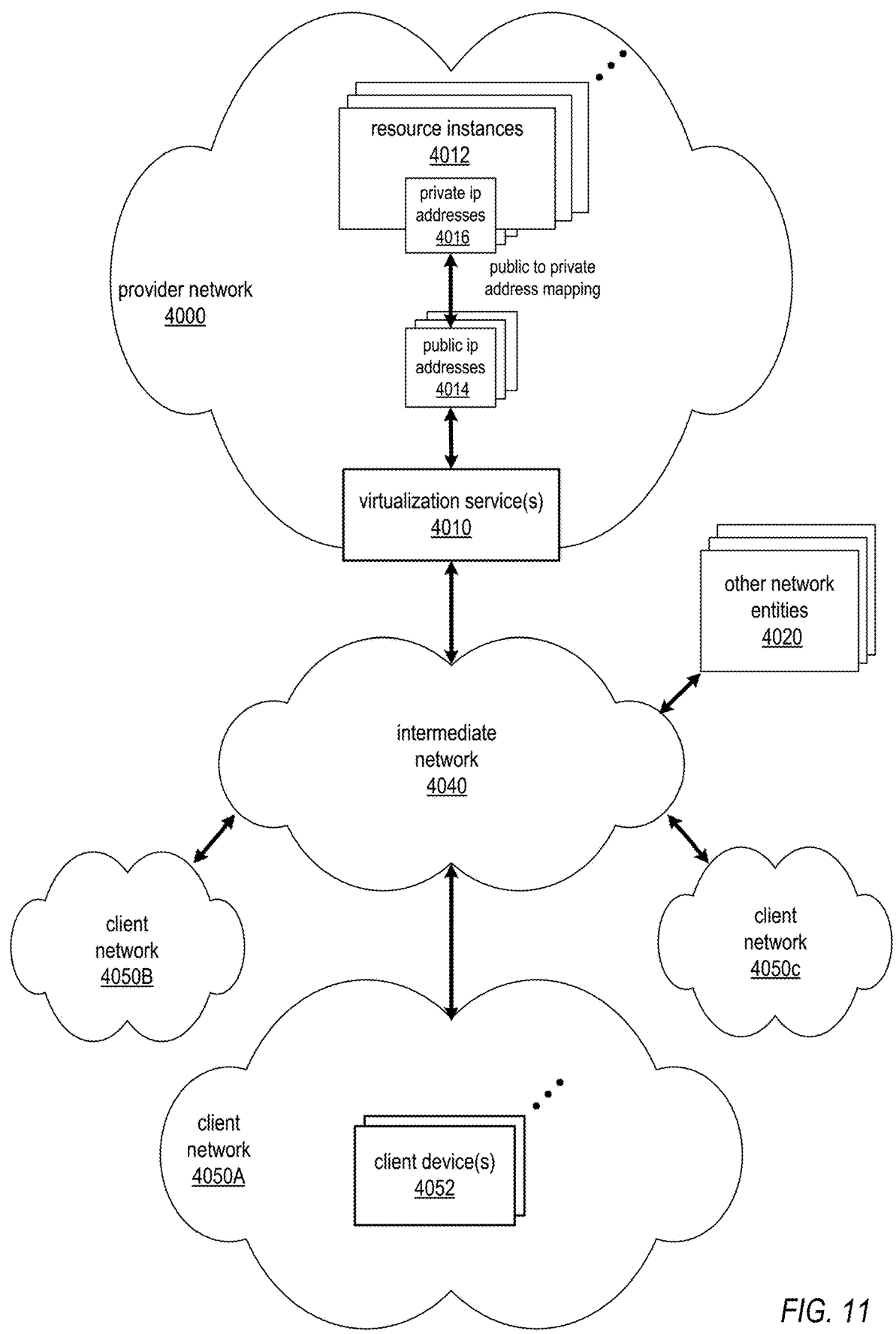
FIG. 11 illustrates an example provider network environment, according to some embodiments.

FIG. 11 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 12:
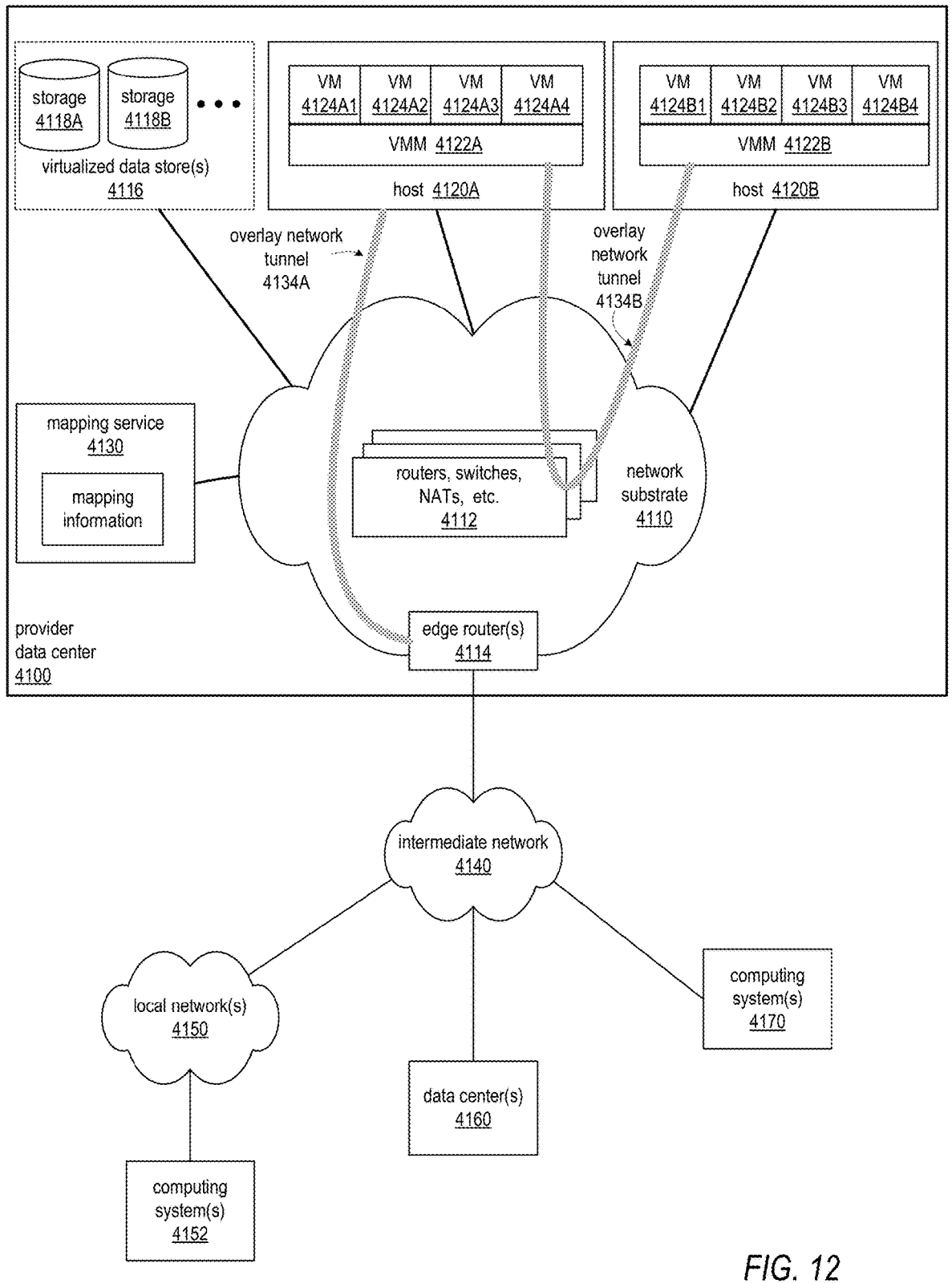
FIG. 12 illustrates an example data center that implements an overlay network on a network substrate using IP tunneling technology, according to some embodiments.

FIG. 12 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 12) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 12, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 12, at least some networks in which embodiments may be implemented may include hardware virtualization technology that enables multiple operating systems to run concurrently on a host computer (e.g., hosts 4120A and 4120B of FIG. 12), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 12 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 13:
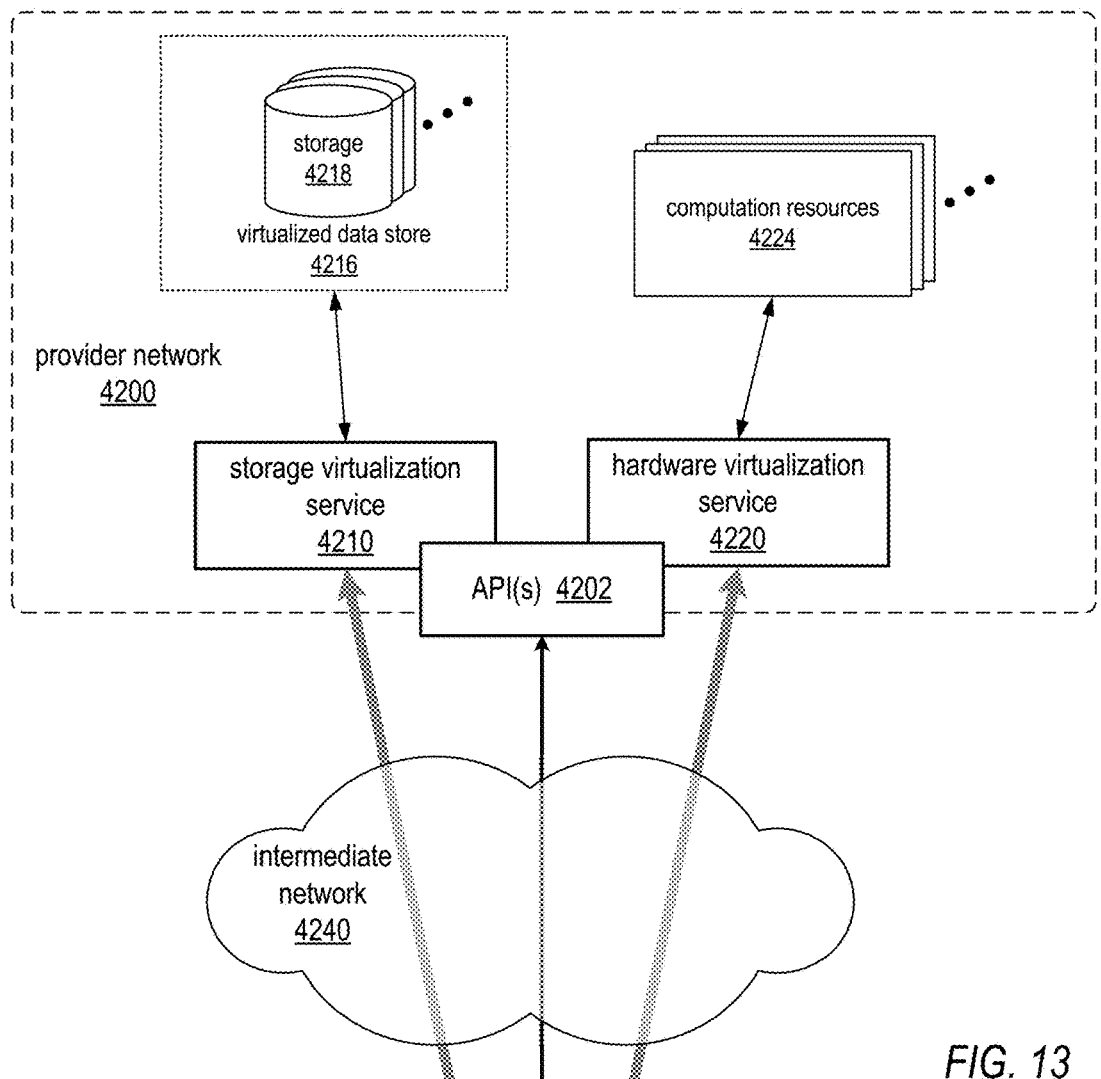
FIG. 13 is a block diagram of an example provider network that provides a storage virtualization service and a hardware virtualization service to clients, according to some embodiments.
Figure 13:
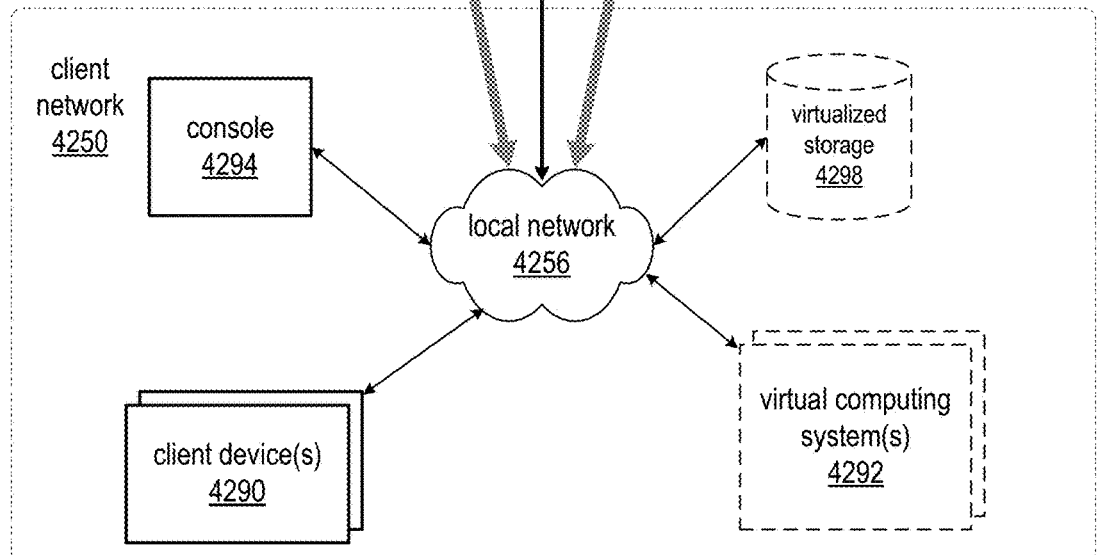

FIG. 13 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 13, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 14:
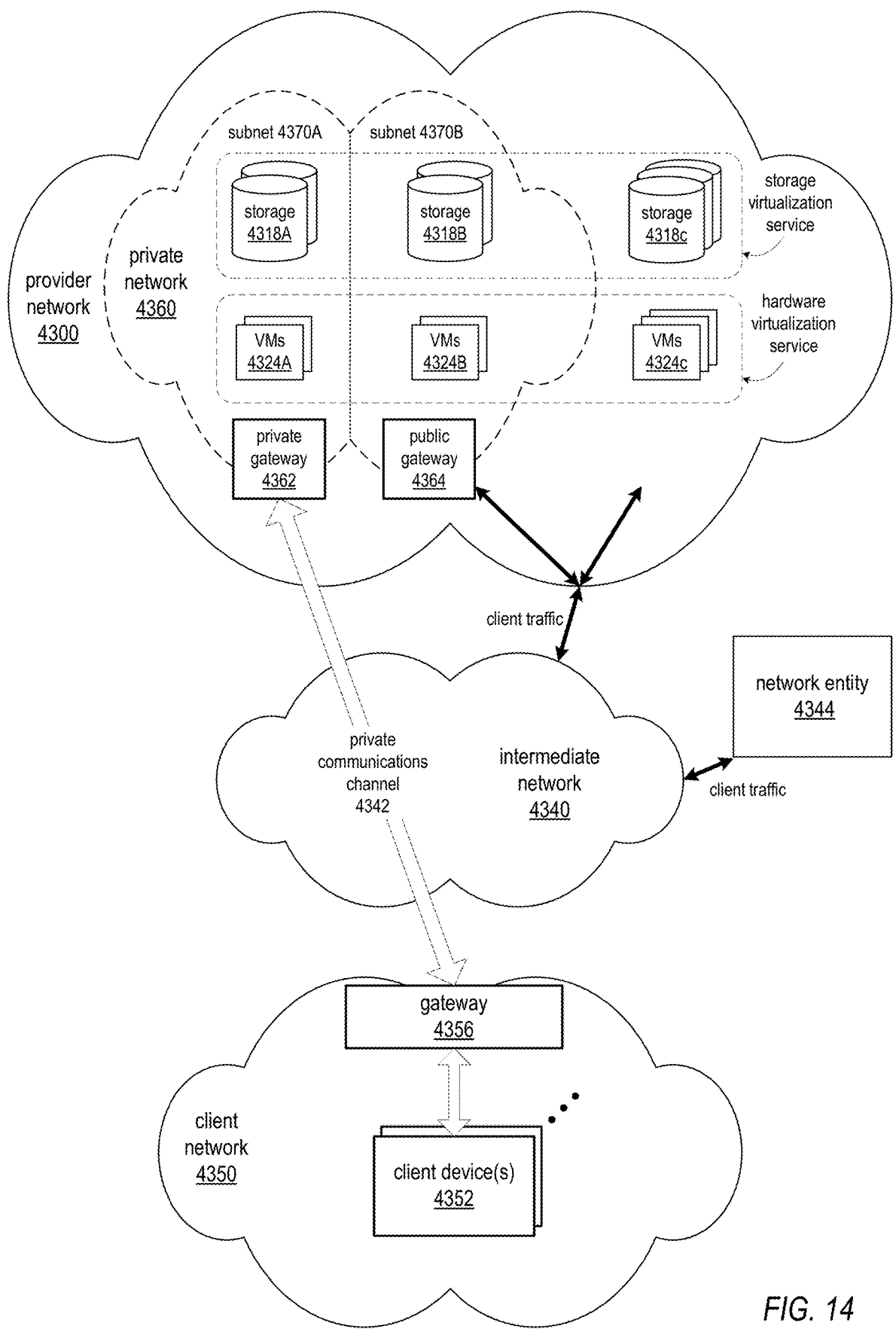
FIG. 14 illustrates an example provider network that provides virtual networks to at least some clients, according to some embodiments.

FIG. 14 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 14 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via a private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 14 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for virtual machine (VM) load monitoring in provider network environments as described herein may include a general-purpose computer system that includes or is configured to access one or more computer-accessible media, such as computer system 5000 illustrated in FIG. 15. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 15 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 14, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 10 for virtual machine (VM) load monitoring in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a host device on a provider network that includes an execution environment for virtual machines (VMs) on the provider network, wherein the execution environment includes resources, comprising one or more processors, used in executing the VMs;
   a load monitor device, implemented on or attached to the host device, and external to the execution environment of the host device, the load monitor device including a programmable hardware device separate from the one or more processors used in executing the VMs, wherein the programmable hardware device comprises an integrated circuit or a separate processor coupled to a memory to cause the load monitor device to:
      receive, from a load data module executing in the execution environment of the host device, resource load data for the VMs executing in the execution environment of the host device;
      analyze the resource load data to generate information indicating current or predicted load behavior of the VMs on the host device;
      determine a VM management decision for the host device based at least in part on the current or predicted load behavior of the VMs on the host device; and
      send an indication of the VM management decision determined for the host device by the load monitor device to a control plane process of the provider network, wherein the load monitor device is separate from and external to the control plane process, and is implemented on or attached to the host device.

2. The system as recited in claim 1, wherein the VM management decision is a decision on whether one or more VMs can be launched on the host device, wherein the decision is made in response to a VM launch request received from the control plane process.

3. The system as recited in claim 1, wherein the VM management decision is a decision to migrate one or more VMs from the host device to another host device on the provider network.

4. The system as recited in claim 1, wherein, to analyze the resource load data to generate information indicating current or predicted load behavior of the VMs on the host device, different load analysis algorithms are applied to the resource load data for at least two of the VMs.

5. The system as recited in claim 1, wherein the resources used in executing the VMs include one or more of computation resources, memory resources, disk resources, network resources, or graphics processing unit (GPU) resources.

6. The system as recited in claim 1, wherein the load data module collects the resource load data for the VMs and sends the resource load data to the load monitor device over a dedicated communications channel not used by the VMs.

7. A method, comprising:
   performing, by a load monitor device:
      receiving load data for one or more virtual machines (VMs) executing on one or more processors in an execution environment of a host device on a provider network, wherein the load monitor device is separate from the one or more processors and is implemented on or attached to the host device, and external to the execution environment of the host device;

analyzing the load data to generate information indicating load behavior of the VMs on the host device;

determining VM management decisions for the host device based at least in part on the load behavior of the VMs on the host device; and sending indications of the VM management decisions determined for the host device by the load monitor device to one or more control plane processes of the provider network, wherein the load monitor device is separate from and external to the one or more control plane processes, and is implemented on or attached to the host device.

8. The method as recited in claim 7, wherein the load data is received from a load data module executing in the execution environment of the host device, the method further comprising the load data module:

collecting the resource load data for the VMs; and sending the resource load data to the load monitor device over a dedicated communications channel not used by the VMs.

9. The method as recited in claim 7, wherein the execution environment of the host device includes resources used in executing the VMs, wherein the load data for a given VM includes data indicating the respective VM's usage of one or more of the resources.

10. The method as recited in claim 9, wherein the resources include one or more of computation resources, memory resources, disk resources, network resources, or graphics processing unit (GPU) resources.

11. The method as recited in claim 7, wherein analyzing the load data to generate information indicating load behavior of the VMs on the host device comprises applying different load analysis algorithms to the load data for at least two of the VMs.

12. The method as recited in claim 11, further comprising adding, removing, replacing, or updating at least one of the load analysis algorithms in response to launching a VM on the host device or migrating a VM from the host device.

13. The method as recited in claim 7, wherein the VM management decisions include decisions on whether one or more VMs can be launched on the host device, the method further comprising:

receiving a VM launch request from a control plane process, wherein the VM launch request indicates one or more VMs to be launched;

evaluating the launch request based on the load behavior of the VMs on the host device to determine that the one or more VMs indicated by the VM launch request can be launched on the host device; and sending an indication that the one or more VMs indicated by the VM launch request can be launched on the host device to the control plane process;

wherein, in response to the indication, the control plane process launches the one or more VMs on the host device.

14. The method as recited in claim 7, wherein the VM management decisions include decisions to migrate VMs from the host device to other host devices on the provider network, the method further comprising:

determining, from the load behavior of the VMs on the host device, that current or predicted load on the host device exceeds a threshold;

determining one or more VMs to be migrated from the host device to reduce load on the host device; and sending a migration request to a control plane process, the migration request indicating that the one or more VMs need to be migrated from the host device;

wherein, in response to the migration request, the control plane process migrates the one or more VMs from the host device to another host device on the provider network.

15. The method as recited in claim 14, wherein determining one or more VMs to be migrated from the host device comprises selecting VMs for migration based on the load behavior of the VMs on the host device, wherein the VMs selected for migration have exhibited lower load for a period of time when compared to other VMs executing on the host device.

16. The method as recited in claim 7, wherein the information indicating load behavior of the VMs on the host device includes information indicating current load behavior of the VMs on the host device and information indicating predicted load behavior of the VMs on the host device, wherein the predicted load behavior is determined based on the load behavior of the VMs on the host device over a period of time.

17. The method as recited in claim 7, further comprising performing, by the load monitor device:

analyzing the load data to generate resource load information for resources used in executing the VMs on the host device, wherein the resource load information indicates current or predicted load state of the resources; and sending the load information to a control plane process of the provider network.

18. The method as recited in claim 17, further comprising performing, by the control plane process:

obtaining resource load information for two or more host devices from respective load monitor devices; and selecting one of the host devices as a target host device for a VM launch or a VM migration based at least in part on the resource load information for the two or more host devices.

19. A non-transitory computer-readable storage medium storing program instructions that when executed on a programmable hardware device cause the programmable hardware device to:

receive load data for one or more virtual machines (VMs) executing on one or more processors separate from the programmable hardware device in an execution environment of a host device on a provider network, wherein the programmable hardware device is implemented on or attached to the host device, and external to the execution environment of the host device;

analyze the load data to generate information indicating load behavior of the VMs on the host device;

determine VM management decisions for the host device based at least in part on the load behavior of the VMs on the host device; and send indications of the VM management decisions determined for the host device by the programmable hardware device to one or more control plane processes of the provider network, wherein the programmable hardware device is separate from and external to the one or more control plane processes, and is implemented on or attached to the host device.

20. The non-transitory computer-readable storage medium as recited in claim 19, wherein the programmable hardware device is a field-programmable gate array (FPGA) integrated circuit (IC).

21. The non-transitory computer-readable storage medium as recited in claim 19, wherein the VM management decisions include:
- decisions on whether one or more VMs can be launched on the host device, wherein a launch decision is made in response to a VM launch request received from a control plane process; and
- decisions to migrate one or more VMs from the host device to another host device on the provider network.

22. The non-transitory computer-readable storage medium as recited in claim 19, where, to analyze the load data to generate information indicating load behavior of the VMs on the host device, the program instructions when executed on the one or more computers cause the programmable hardware device to apply different load analysis algorithms to the load data for at least two of the VMs.

* * * * *